US012041561B2

(12) United States Patent
Tamma et al.

(10) Patent No.: US 12,041,561 B2
(45) Date of Patent: Jul. 16, 2024

(54) METHOD AND TECHNIQUE OF HIGHLY ACCURATE CARRIER FREQUENCY OFFSET ESTIMATION

(71) Applicant: NXP B.V., Eindhoven (NL)

(72) Inventors: Raja Venkatesh Tamma, Cedar Park, TX (US); Khurram Waheed, Austin, TX (US)

(73) Assignee: NXP B.V., Eindhoven (NL)

( * ) Notice: Subject to any disclaimer, the term of this patent is extended or adjusted under 35 U.S.C. 154(b) by 132 days.

(21) Appl. No.: 17/224,403

(22) Filed: Apr. 7, 2021

(65) Prior Publication Data

US 2022/0330180 A1 Oct. 13, 2022

(51) Int. Cl.
*H04W 56/00* (2009.01)
*H04L 69/22* (2022.01)
*H04W 4/80* (2018.01)

(52) U.S. Cl.
CPC .......... *H04W 56/001* (2013.01); *H04L 69/22* (2013.01); *H04W 4/80* (2018.02)

(58) Field of Classification Search
None
See application file for complete search history.

(56) References Cited

U.S. PATENT DOCUMENTS

| | | |
|---|---|---|
| 8,249,028 B2 | 8/2012 | Porras et al. |
| 8,446,938 B2 | 5/2013 | Li |
| 8,457,673 B2 | 6/2013 | Thomas et al. |
| 8,595,070 B1 | 11/2013 | Barnes et al. |
| 9,986,377 B2 | 5/2018 | Li et al. |
| 10,530,905 B1 | 1/2020 | Rey et al. |
| 10,742,461 B2 | 8/2020 | Rogel et al. |
| 2017/0238328 A1 | 8/2017 | Luong et al. |
| 2019/0028316 A1* | 1/2019 | Chu .................. H04L 7/042 |
| 2019/0349228 A1* | 11/2019 | Olsen ................ H04L 27/22 |
| 2020/0112464 A1* | 4/2020 | Rogel ................ H04W 12/06 |

(Continued)

FOREIGN PATENT DOCUMENTS

| | | | | |
|---|---|---|---|---|
| EP | 3195541 A2 * | 7/2017 | ............. | G01S 13/00 |
| EP | 3490209 A1 | 5/2019 | | |

OTHER PUBLICATIONS

Carlos Neri, NXP, BLE and Localization, AMF-AUT-T3470, Oct. 2018 (Year: 2018).*

(Continued)

*Primary Examiner* — Derrick W Ferris
*Assistant Examiner* — Keith Follansbee

(57) ABSTRACT

A wireless communication system (100) estimates a carrier frequency offset between wireless devices (101, 102) by configuring the devices through exchanging packet configuration packets (121, 125) to specify a carrier frequency offset fingerprint (CFOF) sequence in a measurement packet (133, 136) which is transmitted between the wireless devices, where the CFOF sequence in the measurement packet includes a prefix component (31), one or more signature segments (32), and a suffix component (33) for performing CFO measurements at the wireless devices which each process IQ samples corresponding to the signature segments in the received measurement packet by correlating the IQ samples against a reference vector to generate, for each of the one or more signature segments, a carrier frequency offset estimate between the first and second wireless devices.

18 Claims, 9 Drawing Sheets

(56) References Cited

U.S. PATENT DOCUMENTS

2020/0287672 A1\* 9/2020 Namboodiri ........ H04L 27/1566
2021/0033737 A1\* 2/2021 Younis .................... G01S 1/024

OTHER PUBLICATIONS

Carlos Neri, NXP, BLE and Localization, AMF-AUT-T3470, Oct. 2018.
Yongchang He, Dialog Semiconductor, Experimental setup for Bluetooth low energy ranging application, Master Thesis, Aug. 9, 2016.
Anh Luong et al., A Stitch in Time and Frequency Synchronization Saves Bandwidth, 2018 17th ACM/IEEE International Conference on Information Processing in Sensor Networks, 2018.
Michael Speth et al., Optimum Receiver Design for OFDM-Based Broadband Transmission—Part II: A Case Study, IEEE Transactions on Communications, vol. 49, No. 4, Apr. 2001.
Khurram Waheed et al., Method and Technique of Power-Efficient Two-Way Phase Based Distance Estimation Using Packet Synchronized Data Capture, U.S. Appl. No. 17/006,619, filed Aug. 28, 2020.
Mihai-Ionut Stanciu et al., Method and Apparatus for Estimating a Time-of-Arrival or a Distance Between Two Devices, Romanian Provisional Application No. A202000576, filed Sep. 11, 2020.
Gul Malik Muhammad Usman et al: "Timing and Frequency Synchronization for OFDM Downlink Transmissions Using Zadoff-Chu Sequences", IEEE Transactions on Wireless Communications, IEEE Service Center, Piscataway, NJ, US, vol. 14, No. 3, Mar. 1, 2015, pp. 1716-1729.

\* cited by examiner

METHOD AND TECHNIQUE OF HIGHLY ACCURATE CARRIER FREQUENCY OFFSET ESTIMATION

BACKGROUND OF THE INVENTION

Field of the Invention

The present invention is directed in general to the field of wireless communications. In one aspect, the present invention relates to wireless ranging and localization systems and methods for device synchronization.

Description of the Related Art

Low-power Industrial, Scientific and Medical (ISM) band wireless standards, such as Bluetooth Classic (BT BR/EDR), Bluetooth Low Energy (BLE) and ANT, are broadly used in industrial and consumer products and IEEE 802.15.4 radios (such as smartphones, tablets, smartwatches, headsets, edge nodes in Internet of Things (IoT) networks) and smart home appliances and devices (such as smart-home hubs, lighting, thermostats, etc.). Increasingly adopted in industrial, medical and automotive market application domains, BLE technology provides a technology for applications that go beyond data transfer between devices since the radios included in these products are capable of advanced applications, such as distance estimation, angle (of arrival/departure) computations, and localization applications that may span the joint estimation of both the angle and the distance, when used with specialized hardware antenna arrangements. For example, Phase-based Distance Estimation (PDE) is a technique developed in the defense and satellite domain for estimating the distance between objects by measuring the phase shift or difference ($\Delta\varphi$) between a measuring device (MD), which is the initiator and determines the need to estimate distance, and an active reflector device (RD) to determine the distance between them. To support wireless ranging between two devices, a system employs a radio at each device, with one device communicating an initial packet to the other device, and with the other device responding with a return packet. Based on the difference between the phase of the received signal and the phase of the transmitted signal, the measuring device can calculate a distance (range) between the two devices. The determined distance can be employed for a variety of functions, such as taking a specified action (e.g., granting secure access to a location or device, such as a car) when the distance is below a threshold.

To support accurate direction-finding and distance estimation for device localization using BT, BLE, ANT or other similar narrowband wireless communication protocols, the two communicating devices need to maintain a tight timing synchrony to minimize errors due to imprecise timing of transmission, reception and measurement events. Since each communication device will typically use its own local oscillator (LO) as its timing reference, it is important to determine a precise carrier frequency offset (CFO) between the two LOs and apply a correction in order to minimize relative time and/or frequency drift which, if left uncorrected, could lead to degrading the measurement. With conventional wireless ranging systems for implementing localization, the CFO is measured by exchanging hundreds of protocol packets and then computing a CFO estimate as the average of the individual coarse CFO estimates computed from each packet exchange. While conventional wireless ranging systems have their benefits, they suffer from several limitations by requiring a significant amount of measurement time to exchange the packets, consuming a relatively high amount of power, and otherwise being too complex or too insecure to be used in a variety of applications. In addition, distance measurement accuracy can be impaired or may not be useful in a targeted application when a large time drift between two communicating devices is not quickly measured.

As seen from the foregoing, the existing wireless direction-finding and distance measurement solutions are extremely difficult to use at a practical level by virtue of the challenges with providing an efficient, practical, reliable and robust system for accurately measuring carrier frequency offset between local oscillators in communicating wireless devices that can meet the performance requirements and cost constraints that are associated with wireless devices solutions.

BRIEF DESCRIPTION OF THE DRAWINGS

The present invention may be understood, and its numerous objects, features and advantages obtained, when the following detailed description of a preferred embodiment is considered in conjunction with the following drawings.

DETAILED DESCRIPTION

Figure 1:
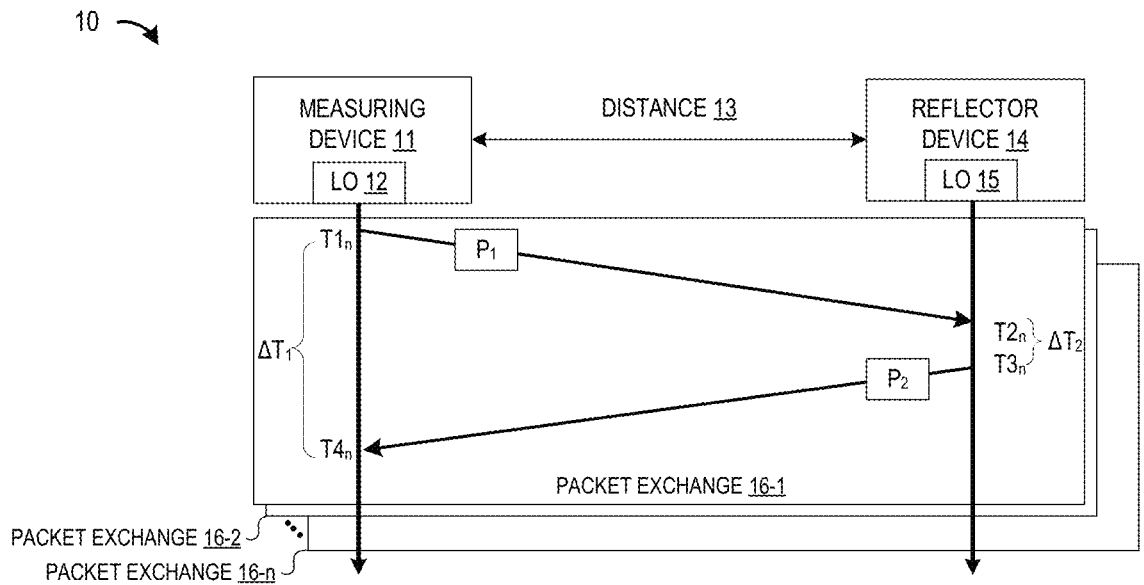
FIG. 1 is a simplified block diagram of a wireless communication system that exchanges hundreds of protocol packets to compute an average CFO measurement.

A high-accuracy carrier frequency offset (CFO) estimation system, circuit, and method are described for constant-envelope continuous phase modulated signals by packaging a protocol packet to include a predetermined bit sequence with a specified prefix, one or more signature elements, and a specified suffix at a possibly known or negotiated location in the protocol packet. In selected embodiments, the predetermined bit sequence includes an m-bit prefix, one or more copies of an L-bit signature segment, and an m-bit suffix, where the m-bit prefix is identical to the last m-bits of the L-bit signature segment and where the m-bit suffix is identical to the first m-bits of the L-bit signature segment. In other embodiments where the predetermined bit sequence includes a single signature segment, the m-bit prefix and m-bit suffix may be predetermined values known to the transmitting and receiving devices without any relationship to the signature segment. By transmitting the predetermined bit sequence in the protocol packet, a receiving device is configured to accurately measure a carrier frequency offset value from the signature element(s) in the detected predetermined bit sequence using, thereby reducing the measurement time and power consumption required to estimate the CFO. When used with BLE, ANT and other similar narrow-band wireless protocols employing continuous-phase frequency modulation techniques (e.g., GFSK, FSK, IEEE 802.15.4g O-QPSK PHY, etc.), the predetermined bit sequence may be formatted as a CFO fingerprinting (CFOF) sequence which may be detected in the physical layer's PDU to produce an accurate CFO estimate that is very useful in localization applications (such as distance estimation using Round-Trip Time (RTT) measurements or phase-based techniques) and/or direction-finding techniques (such as angle-of-arrival/angle-of departure). An accurate CFO measurement can be also used as a metric for authenticating communication with a known peer device using an RF fingerprinting technique. The disclosed CFO estimation method and apparatus for embedding a known CFOF sequence in the PDU is designed to cause minimal disruption to the protocol procedure and provides a level of accuracy that is much higher than what is afforded by typical packet synchronization techniques using the Start-of-Frame Delimiter (SFD) or Access Address (in BLE). In addition, the disclosed CFOF sequence provides for a flexible accuracy level by increasing the number of signature segments in each CFOF sequence (for higher accuracy) or decreasing the number of signature segments in each CFOF sequence (for lower accuracy).

In selected embodiments, a two-way CFO estimation process allows two wireless devices to each measure their respective CFO values with respect to one another by using a message exchange sequence that includes a measurement start indication or request stage, a parameter configuration exchange stage, a configuration application stage, a carrier frequency offset (CFO) measurement stage, and one or more data processing stages for using the CFO measurement to coordinate the LOs of the wireless devices. During the start indication stage, each wireless device sends an indication to the other wireless device that a CFO measurement is being initiated, where the indication may use a general protocol packet. During the parameter configuration exchange stage, the wireless devices exchange configuration packets (and corresponding acknowledgement messages) so that each device can know the content the CFOF sequence (e.g., the number of signature segments and the bit pattern of the signature segment(s)), the number of CFOF sequences, and the location of the CFOF sequence in a CFO measurement packet being transmitted by the wireless devices. During the configuration application stage, the wireless devices apply any required transformation of the CFOF sequence (e.g., whitening) and insert or integrate the (transformed) CFOF sequence into the CFO measurement packets (e.g., PDU of BLE packet) for transmission to the other wireless device. During the CFO measurement stage, each wireless device receives a CFO measurement packet as IQ data samples. In selected embodiments, the received IQ data samples are converted into phase values which are compared to a reference vector to detect a peak correlation and compute a CFO estimate from the peak correlation value. In other embodiments, the received IQ data samples are correlated at the CFOF detector. During the data processing stages, the CFO estimate at each wireless device is used with localization applications, authentication applications, and the like.

Various illustrative embodiments will now be described in detail with reference to the accompanying figures. As described hereinbelow, the disclosed embodiments can be arranged and designed in a wide variety of different configurations. Thus, the following detailed description of various embodiments, as represented in the figures, is not intended to limit the scope of the present disclosure, but is merely representative of various embodiments. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. In addition, the various aspects of the embodiments are presented in drawings that are not necessarily drawn to scale unless specifically indicated. Furthermore, the described features, advantages, and characteristics of the invention may be combined in any suitable manner in one or more embodiments. One skilled in the relevant art will recognize, in light of the description herein, that the embodiments can be practiced without one or more of the specific features or advantages of a particular embodiment. In other instances, additional features and advantages may be recognized in certain embodiments that may not be present in all embodiments. For example, selected aspects are depicted with reference to simplified circuit schematic drawings without including every circuit detail in order to avoid limiting or obscuring the present invention. Such details are well known and not considered necessary to teach one skilled in the art of how to make or use the present invention.

To provide additional details for a contextual understanding for the present disclosure, reference is now made to FIG. 1 which depicts a simplified block diagram of a wireless communication system 10 that includes a first wireless measuring device 11 having its own local oscillator or clock 12, and that includes a second wireless reflector device 14 that includes its own local oscillator or clock 15. The wireless communication system 10 can be employed in a variety of applications. For example, in at least one embodiment, the measuring device 11 is an automobile, the reflector device 14 is a key fob, and the distance 13 identified by the wireless ranging system 10 is used to determine whether a user is in close proximity to the automobile to, for example, automatically unlock an automobile door. In another embodiment, the measuring device 11 is a sensor device located in a warehouse, the reflector device 14 is a sensor affixed to an asset to be tracked, and the distance 13 identified by the wireless ranging system 10 is used to determine whether the asset has been removed from a warehouse shelf or other storage location.

To track the distance 13 between two devices 11, 14, the wireless ranging system 10 can employ any of several distance measuring applications. For example, a multi-stage wireless ranging protocol may perform a phase-based estimation of the distance 13 by calculating a round-trip time (RTT) for exchanging the packets $P_1$, $P_2$ between the wireless devices 11, 14. By computing the RTT as the difference between the total time duration for the packet exchange ($\Delta T_1 = T4_n - T1_n$) and the reflector processing time duration ($\Delta T_2 = T3_n - T2_n$), the time of flight duration ToF for transmitting a packet may be computed as ToF=½ RTT, allowing the distance 13 between the wireless devices 11, 14 to be determined. While each time interval $\Delta T_1$, $\Delta T_2$ is local to its respective wireless device 11, 14, the ability of one device (e.g., the measuring device 11) to accurately measure the time interval of the other device (e.g., interval $\Delta T_2$ at the reflector device 14) requires accurate synchronization of the separate LO clocks 12, 15 across the two devices 11, 14. In existing localization implementations, clock synchronization is obtained by exchanging hundreds of protocol packets 16-1, 16-2, . . . 16-n and then averaging the individual estimates to accurately measure a carrier frequency offset between the wireless devices 11, 14. Unfortunately, the measurement time, power consumption, and processing resources required to perform hundreds of packet exchange-based measurements are not well suited for maintaining tight synchronization between the LO clocks 12, 15 of the wireless devices 11, 14 due to errors arising from imprecise timing of transmission, reception and measurement events.

Figure 2:
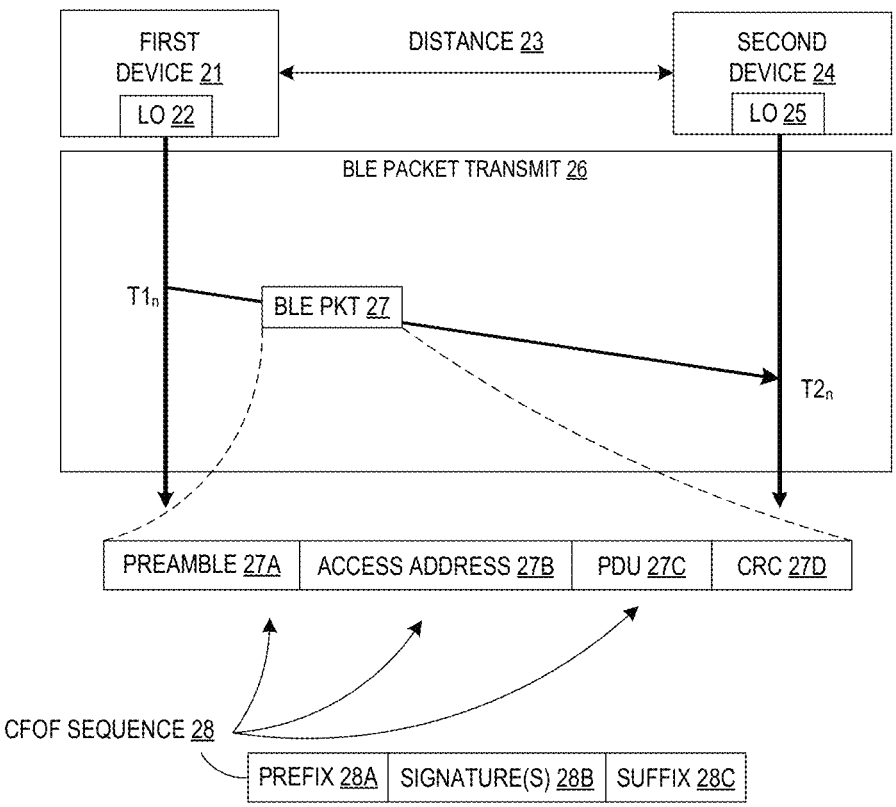
FIG. 2 is a simplified block diagram of a wireless communication system that uses a flexibly-defined CFO fingerprint (CFOF) sequence in one or more defined protocol packets to compute an accurate CFO measurement in accordance with selected embodiments of the present disclosure.

For an improved understanding of selected embodiments of the present disclosure, reference is now made to FIG. 2 which illustrates a simplified block diagram of a wireless communication system 20 that uses a flexibly-defined CFO fingerprint (CFOF) sequence 28 in one or more defined protocol packets 27 to compute an accurate CFO measurement. Any suitable packet structure may be used for the packet(s) 27 that are used to measure CFO values. For example, the protocol packet 27 may employ a generic packet structure which includes a preamble portion 27A, an access address (AA) portion 27B, a payload or PDU portion 27C, and a CRC portion 27d. As will be understood, the preamble portion 27A includes a predetermined sequence of 0's and 1's that are used to make a receiver aware that a packet is about to be received. The AA portion 27B is the packet identifier which allows the receiver to determine if the packet 27 is intended for it or not (in which case it is ignored). While the AA bit seq is known a priori and is mainly used by the receiver for timing and frequency synchronization, it could be used as an identifier if the detected AA sequence differs from the expected AA sequence in one or more bit locations, in which case the packet may be discarded as it may not be meant for the receiving device. The payload/PDU portion 27C is the data content of the packet that is to be transmitted and that is evaluated at the receiver to compute one or more CFO values. The CRC portion 27D may include error correction data, such as a checksum for verifying there are no errors during the packet reception.

As depicted, the wireless communication system 20 includes a first wireless device 21 and LO clock 22, and further includes a second wireless device 24 and LO clock 25. Instead of using hundreds of protocol packet exchanges to synchronize the LOs, the wireless communication system 20 uses a flexibly-defined CFO fingerprint (CFOF) sequence 28 that is embedded in one or more defined protocol packets 27 to enable accurate CFO measurement at either or both of the wireless devices 21, 24. Generally speaking, the CFOF sequence 28 includes a prefix portion 28A, one or more signature elements 28B, and a suffix portion 28C which are defined and structured so that the prefix and suffix portions 28A, 28C serve as guard symbols to ensure there is no uncertainty about the signal phase at the edges of the signature segment(s) 28B which are guarded from the adjacent unknown bits.

By configuring the wireless device with sequence parameters for the length and content of the CFOF sequence 28A-C, the wireless device which receives the BLE packet 27 can generate a highly accurate CFO estimate from each signature segment 28B in the CFOF sequence 28. As disclosed herein, the specific structural requirements for the CFOF sequence 28 govern the choice of the bit patterns used for the prefix, suffix and signature segments to provide high estimation accuracy, regardless of the auto-correlation and cross-correlation properties of the signature segments 28B. As will be appreciated, the wireless device configuration is not unilateral since the capabilities of both devices needs to be considered. For example, the configuration choices for the wireless measuring device are made based on knowledge about the other device's capabilities. And when the devices switch roles in measuring the CFO estimate, then the wireless device configuration may again depends on the capabilities of both devices. In selected embodiments, the transmitting wireless device 21 configures the receiving wireless device 24 by generating and inserting sequence parameters into a configuration packet (not shown) that is transmitted to the receiving wireless device 24. In this way, the configuration packet can provide the receiving wireless device with information about the prefix, signature segments and suffix (and optionally also the CFOF sequence location) by processing the demodulated and decoded configuration packet. In certain cases of FEC transmit processing (e.g., whitening), the transmitting wireless device 21 may transform each CFOF sequence prior to insertion in the BLE packet to account for FEC transmit processing that would change the desired CFOF sequence(s) during modulation for transmission. This transformation of the CFOF sequence 28 is required since, upon receiving the BLE packet 27, the receiving wireless device will expect to see the CFOF sequence 28 at a predetermined location (e.g., the PDU) before performing FEC decoding.

Upon receiving the configuration packet, the receiving wireless device 24 is configured with the sequence parameters which specify the length and content of the CFOF sequence 28A-C, including the prefix portion 28A, one or more signature elements 28B, and a suffix portion 28C. At a minimum, the sequence parameters of the configuration packet specify the content the signature segment(s) 28B (e.g., the number of signature segments and the bit pattern of the signature segment) and the number of CFOF sequences in a CFO measurement packet being transmitted by the wireless devices. In addition, the sequence parameters may optionally specify location of the CFOF sequence in CFO measurement packet. For example, if the AA is treated as the portion 28B (e.g., HADM application), the location is known implicitly. Alternatively, if the CFOF sequence is embedded in the PDU, knowing its location will allow the receiver to trigger the CFOF detector at precise times to detect the signature segments and make CFO estimates. Otherwise, the detector needs to be turned ON throughout the PDU demodulation process which consumes more power. While the sequence parameters may also specify the content of the prefix portion 28A and suffix portion 28C, the prefix/suffix portions of the CFOF sequence 28 may instead be known a priori to the receiving wireless device under predetermined algorithmic rules, such as described hereinbelow, for generating the prefix portion 28A and suffix portion 28C.

Once the receiving wireless device 24 is configured with the sequence parameters, the transmitting wireless device 21 may embed the CFOF sequence 28 in one or more predetermined locations of a BLE packet 27 that is transmitted to the second wireless device 24. If necessary, the transmitting wireless device 21 may transform each CFOF sequence 28 prior to insertion in the BLE packet 27 by the link layer so that, after FEC transmit processing, the desired CFOF sequence(s) are modulated and eventually transmitted over-the-air. In a first example location and as detailed further hereinbelow, the CFOF sequence 28 may be contained entirely within the PDU field 27C of the BLE packet 27. In another example location detailed further hereinbelow, the CFOF sequence 28 may be contained in at least part of the preamble field 27A, access address field 27B, and PDU field 27C of the BLE packet 27, but not in the CRC field 27D. Wherever located in the BLE packet 27, the CFOF sequence 28 may be transmitted in a single BLE packet transmission event 26 where the first wireless device 21 transmits the BLE packet 27 at transmission time T1n and where the second wireless device 24 receives the BLE packet 27 at reception time T2n. At the receiving wireless device 24, a CFOF sequence detector is provided to detect each CFOF sequence and produce a CFO estimate (or an average of multiple CFO estimates, if applicable) between the LO clocks 22, 25.

Figure 3:
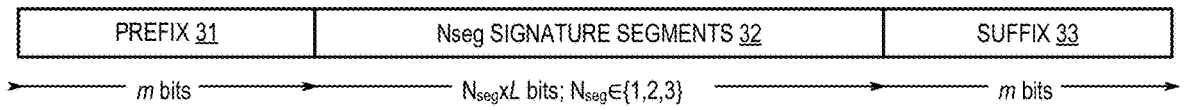
FIG. 3 illustrates a first example CFOF sequence having a multi-bit prefix, one or more signature segments, and a multi-bit suffix which is transmitted in a BLE packet to enable highly accurate CFO estimation in accordance with selected embodiments of the present disclosure.

As disclosed herein, any suitable packet structure may be used for the CFO measurement packets (e.g., 27) that are used to estimate CFO values. For example, reference is now made to FIG. 3 which illustrates a first example CFOF sequence 30 having a multi-bit prefix portion 31, a signature segment portion 32, and a multi-bit suffix portion 33 which is transmitted in a BLE packet to enable highly accurate CFO estimation. In the depicted structure of the CFOF sequence 30, the signature segment portion 32 includes Nseg signature segments. As disclosed herein, each of the Nseg signature segments 32 may be identical to one another, but this is not required. Thus, the Nseg signature segments 32 may use identical L-bit segments in selected embodiments, but non-identical L-bit segments may be used in other embodiments. With each signature segment being a predetermined sequence of L-bits, and with Nseg being an integer greater than or equal to 1 (typically 1, 2, or 3), the signature segment portion 32 defines a pattern containing Nseg copies of the L-bit signature segment, for a total bit length of Nseg×L. By using multiple identical signature segments in the signature segment portion 32, it is possible to improve the quality of the CFO estimate through averaging while keeping receiver complexity low because one short reference waveform will suffice. In embodiments where each of the L-bit segments is different, a separate reference vector will be required to detect each segment, thereby increasing the receiver complexity.

In the depicted structure of the CFOF sequence 30, the multi-bit prefix portion 31 is at least a minimum number of m bits long and the multi-bit suffix portion 33 is at least m bits long. As a general rule, the length (m bits) of the prefix and suffix should at least equal the length of the frequency pulse, so the prefix and suffix portions 31, 33 could have different lengths. In addition, the content of the multi-bit prefix portion 31 and suffix portion 33 should be known a priori to the receiving wireless device using a predetermined rule. In selected embodiments where there are two or more copies of the signature segment in the signature segment portion 32 (e.g., Nseg≥1), then a predetermined rule may specify that the content of the prefix portion 31 shall be identical to the last m bits of the signature segment, and that the content of the suffix portion 33 shall be identical to the first m bits of the signature segment. However, if there is only one signature segment in the signature segment portion 32 (e.g., Nseg=1) or if portion 32 has multiple unique signature segments, then it is sufficient for a predetermined rule to specify that their bit patterns be known so that there is no required relationship with the signature segment. While a predetermined rule for the content of the prefix and suffix portions 31, 33 will simplify the CFOF detector implementation, it is not required in all embodiments. In general, it is sufficient that the prefix and suffix portions 31, 33 be known to the receiving wireless device. If the signature segment portion 32 has multiple identical signature segments and the prefix and suffix portions 31, 33 are arbitrarily chosen, then the receiving wireless device will use its knowledge of the prefix and suffix bit sequences to build a unique reference vector for use in detecting each signature segment.

Figure 4:
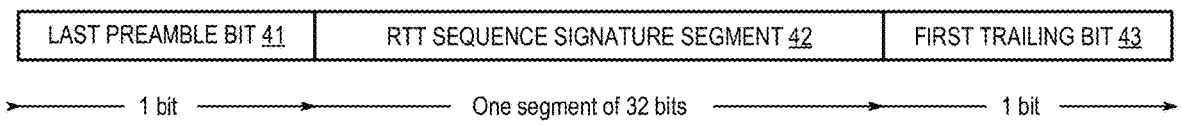
FIG. 4 illustrates a second example CFOF sequence having a 1-bit prefix, one signature segment, and a 1-bit suffix which is transmitted in an LE 2M PHY packet to enable highly accurate CFO estimation in accordance with selected embodiments of the present disclosure.

To provide additional details for an improved understanding of selected embodiments of the present disclosure, reference is now made to FIG. 4 which illustrates a second example CFOF sequence 40 having a prefix portion 41, an RTT sequence signature segment portion 42, and a suffix portion 43 which is transmitted in an LE 2M PHY packet to enable highly accurate CFO estimation. In the depicted structure of the CFOF sequence 40, the RTT sequence signature segment portion 42 represents a special case of a CFOF sequence which includes a single 32-bit signature segment that is located in the Access Address field of the BLE packet. Since LE 2M modulation uses a Gaussian pulse with BT=2, each of the prefix and suffix portions needs to be only 1 bit long. As a result, the prefix portion 41 is a 1-bit prefix which is located in the last bit (MSB) of the preamble field of the BLE packet, while the suffix portion 43 is a 1-bit suffix which is located in the first trailing bit of the PDU field after the RTT sequence signature segment portion 42. As seen from the foregoing, this is a special case of a CFOF sequence where Nseg=1, L=32, and m=1. Since the 32-bit RTT sequence signature segment portion 42 is sandwiched by a 16-bit long preamble and a 4-bits long trailing sequence from the PDU, both the prefix and suffix 41, 43 share well-defined relationships with the RTT pattern 42, and are therefore derivable from the bits of the RTT sequence signature segment portion 42. In the LE 2M PHY packet example where the preamble (and therefore, the prefix) shares a defined relationship with the RTT sequence signature segment portion 42 while the suffix portion 43 is a fixed bit sequence of 0's, it is necessary and sufficient to know the prefix and suffix portions 41, 42.

Figure 5:
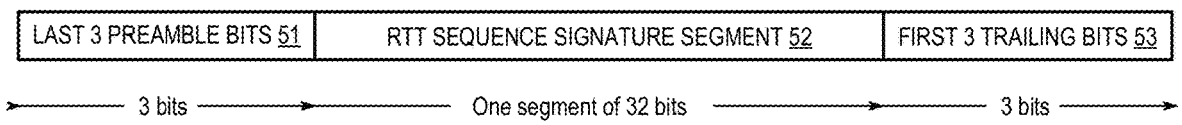
FIG. 5 illustrates a third example CFOF sequence having a 3-bit prefix, one signature segment, and a 3-bit suffix which is transmitted in an LE 1M PHY packet to enable highly accurate CFO estimation in accordance with selected embodiments of the present disclosure.

To provide additional details for an improved understanding of selected embodiments of the present disclosure, reference is now made to FIG. 5 which illustrates a third example CFOF sequence 50 having a prefix portion 51, an AA sequence signature segment portion 52, and a suffix portion 53 which is transmitted in an LE 1M PHY packet to enable highly accurate CFO estimation. In the depicted structure of the CFOF sequence 50, the AA sequence signature segment portion 52 includes a single 32-bit signature segment which is located in the Access Address field of the BLE packet. Since LE 1M modulation uses a Gaussian pulse with BT=0.5, each of the prefix and suffix portions 51, 53 needs to be 3 bits long. As a result, the prefix portion 51 is a 3-bit prefix which is located in the 3 last or most significant bits of the preamble field of the BLE packet, while the suffix portion 53 is a 3-bit suffix which is located in the first three trailing bits of the PDU field after the RTT sequence signature segment portion 52. As seen from the foregoing, this is a special case of a CFOF sequence where Nseg=1, L=32, and m=3. Since the 32-bit RTT sequence signature segment portion 42 is sandwiched by an 8-bit long preamble and a 4-bits long trailing sequence from the PDU, both the prefix and suffix 51, 53 share well-defined relationships with the RTT pattern 52, and are therefore derivable from the bits of the RTT sequence signature segment portion 52. In the LE 1M PHY packet example where the preamble (and therefore, the prefix) shares a defined relationship with the AA sequence of the LE 1M PHY, the suffix is part of the PDU header whose bit sequence may not be known a priori. In this case, the information about the suffix portion should come from the configuration packet.

As noted above, a CFOF sequence having a single signature element may be located entirely in the PDU field or may be located with the signature element positioned in the Start-of-Frame Delimiter (SFD), which is also known as the Access Address field in BLE and the RTT sequence in High Accuracy Distance Measurement (HADM). When located in the SFD, the signature segment should possess good auto-correlation and cross-correlation properties which can be achieved by placing a variety of restrictions on the bit sequence of the signature segment, such as known to those skilled in the art. However, in applications where the CFOF sequence is embedded within the PDU part of the packet, such restrictions on the signature segment(s) are not necessary because the packet's SFD will be used for timing synchronization and CFO estimation. In addition, if the receiver does not have a priori knowledge of the location of the CFOF sequence in the PDU, the CFOF sequence detector may be kept ON and running throughout the PDU demodulation until the CFOF sequence is detected and the CFO estimate is computed. However, when the receiver knows a priori the CFOF sequence's location from the previously-received configuration packet, the receiver can precisely deduce the location of the CFOF sequence in the incoming symbol demodulator's input samples. This location knowledge enables the receiver to trigger a CFOF sequence detector at precise sample instants corresponding to the end-point of each signature segment and obtain very accurate CFO estimates, thereby reducing the CFOF sequence detector's power consumption. When triggered in alignment with a signature segment, the CFOF sequence detector will take the samples corresponding to a segment and correlate them against the reference signal. By virtue of the sampling being aligned with each signature segment, the auto-correlation properties of the signature segment become less important. In addition, the CFOF sequence detector will have low numerical complexity, and will therefore consume very little power. If desired, the design of the CFOF sequence detector may be further simplified by avoiding long sequences of 1's or 0's in the signature segments, but this is not necessary in all embodiments.

As for CFOF sequences having multiple signature segments, such CFOF sequences should be located to be entirely contained within the PDU. Since the PDU field generally has a header which conveys PDU parameters (e.g., length etc.), the CFOF sequence can be placed anywhere in the PDU field without encroaching into the PDU header.

In addition to properly defining the structure and location of the signature element(s) in the CFOF sequence, the prefix and suffix portions of the CFOF sequence are also important for supporting accurate CFO estimation since they serve to align the signal phase at the edges of the outer signature segments which enable highly accurate CFO estimates from each segment. Without including the prefix and suffix portions, the CFO estimates from signature segments near the edge of a CFOF sequence may not be reliable since, depending on the frequency pulse and the packet bits immediately adjacent to the CFOF sequence, the edge segments can produce estimates with large biases if the same reference vector is used for correlating and detecting all the identical signature segments.

Figure 6:
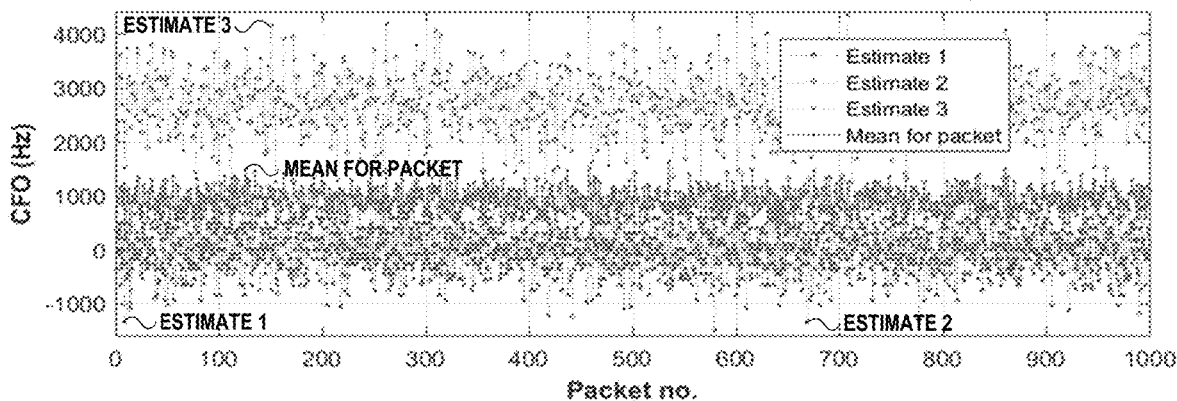
FIG. 6 illustrates CFO measurement test results from using BLE packets which include signature segments without a prefix and suffix.
Figure 6:
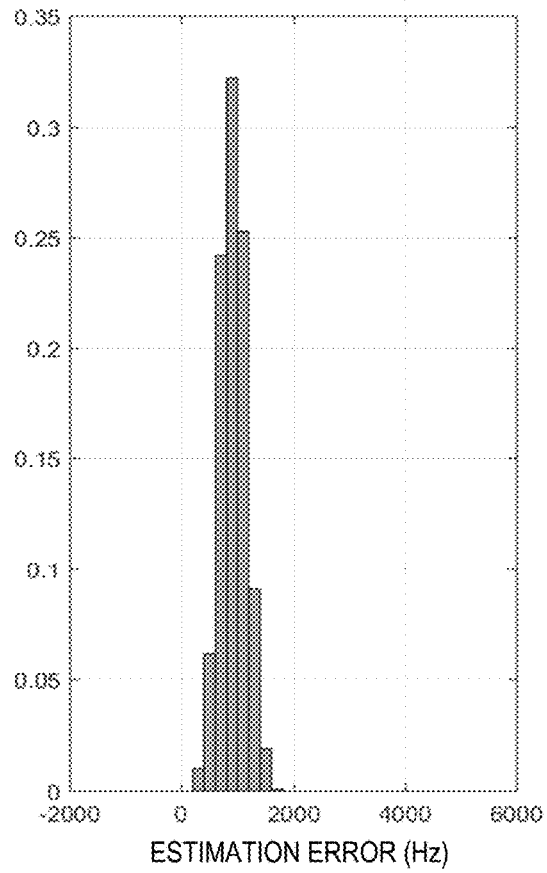
Figure 6:
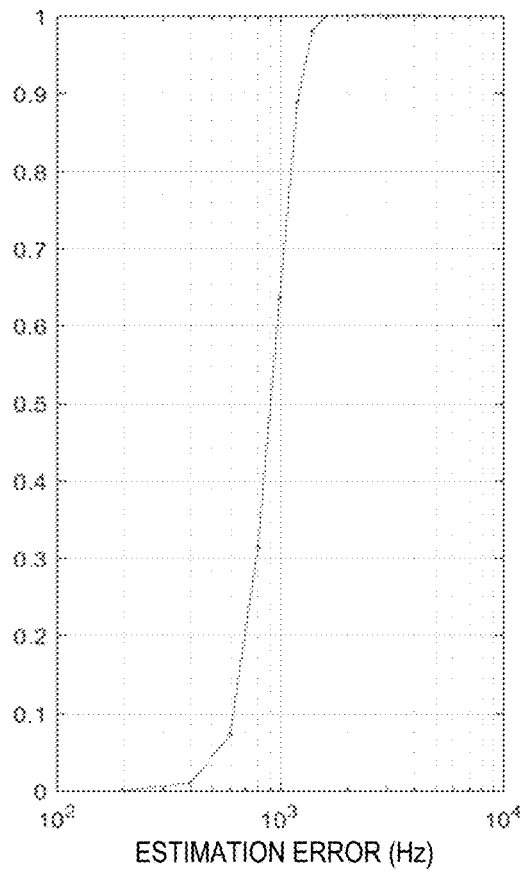

To illustrate how such CFO estimation biases can arise, reference is now made to FIG. 6 which illustrates CFO measurement test results 60-62 from using BLE packets which include three identical signature segments without also including prefix and suffix portions, where the receiver tried to detect all three segments using the same reference vector. In particular, the top chart 60 shows the CFO estimate test results (y-axis) for 1000 trials (x-axis), where each trial consists of receiving one BLE packet containing a CFOF sequence within the PDU field and taking a CFO measurement. In this example, each CFOF sequence does not include a prefix or suffix portion, but does include 3 signature segments, thereby enabling one CFO estimate from each signature segment (Estimate 1, Estimate 2, Estimate 3). In addition, the three CFO estimates are then averaged to get the overall CFO estimate (Mean for packet). As seen from the CFO estimate plots, the CFO estimates from the third signature segment (Estimate 3) have a 2.5-3.0 kHz bias compared to the CFO estimates from the first and second signature segments which severely degrades the overall (mean) estimate from each packet. When multiple CFOF sequences are used, biased estimates can arise from the first segment or from the last segment or sometimes from both of the outer segments. The resulting CFO estimation error is illustrated with the histogram plot 61 and the cumulative distribution function (CDF) plot 62 of the mean/overall CFO estimates from the 1000 trials. In particular, the estimation error histogram 61 and the CDF plot 62 show that, when using CFOF sequences without a prefix or suffix portion, the averaged CFO estimate could have a large error. As will be appreciated, if different signature segments were used, a unique reference vector could be designed for each segment, and this would enable the inner segments to be used to get an unbiased CFO estimate from each inner segment. However, if the prefix and suffix are not known (or absent), FIG. 6 shows that a large bias could result from using the unique reference vector to compute a CFO estimate from the outer segments.

Figure 7:
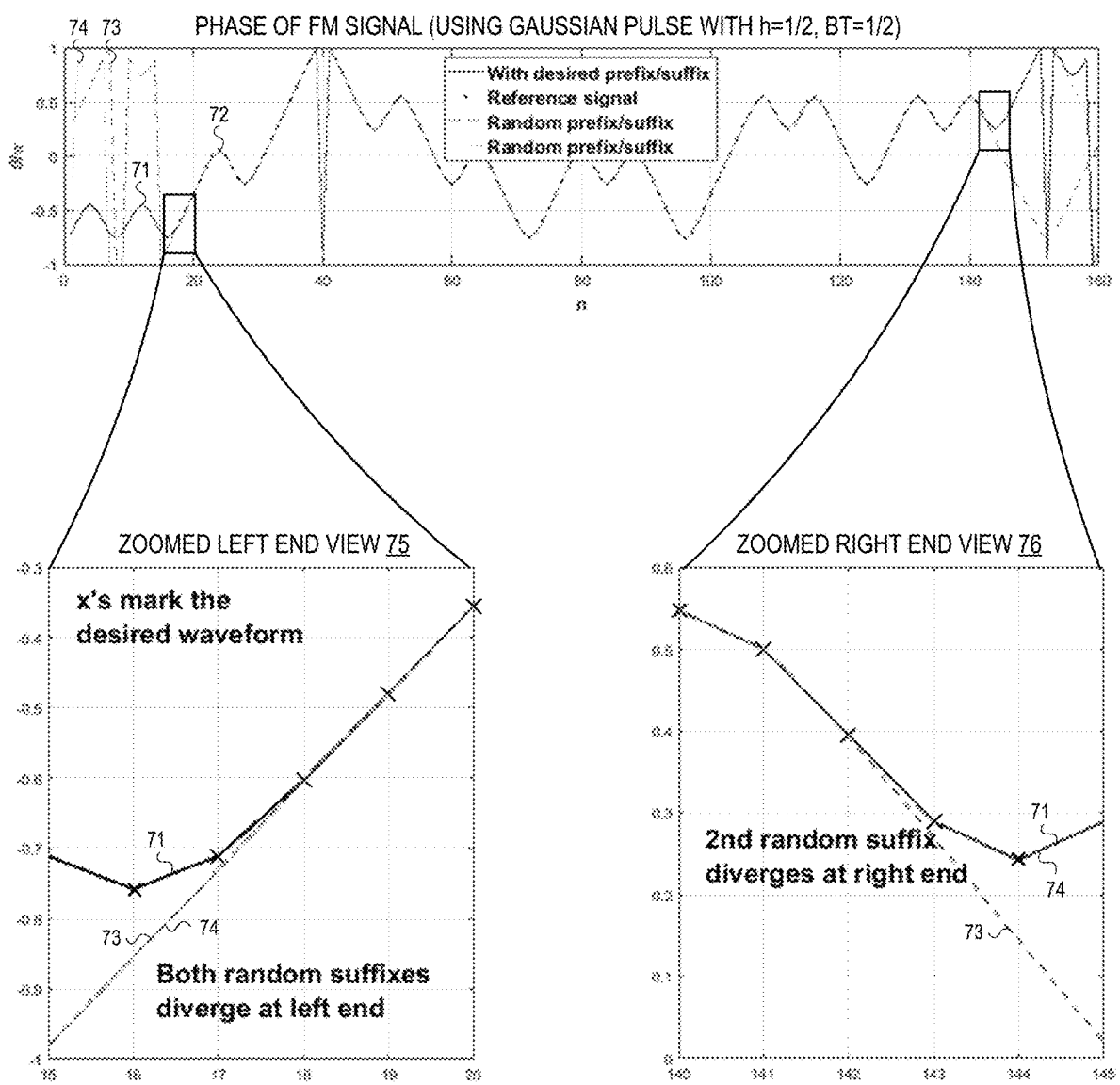
FIG. 7 illustrates the FM signal phase waveform obtained from transmitting BLE packets which include signature segments in a CFOF signature sequence with a random prefix and suffix in a FM modulator using a first Gaussian pulse.

As seen from the foregoing, it is important to include prefix and suffix portions in a multi-segment CFOF sequence in order to avoid calculating biased CFO estimates from the signature segments. However, not just any bit patterns for the prefix/suffix portions may be used with multi-segment CFOF sequences. For example, randomly generated prefix and suffix portions can create uncertainty at one or both ends of the signature segment portion which degrades CFO estimation, and will preclude the use of a single reference vector for detecting all signature segments. The impact of randomly generated prefix and suffix portions on CFO estimation accuracy is illustrated in FIG. 7 which depicts the FM signal phase waveform plots 70 obtained from transmitting BLE packets which include three signature segments in a CFOF sequence in a FM modulator using a first Gaussian pulse with h=½ and BT=½. The first FM signal phase plot 71 is generated for a 3-segment CFOF sequence that includes prefix and suffix portions which conform to the structural requirements of the present disclosure, and the second FM signal phase plot 72 depicts the reference signal. The third FM signal phase plot 73 is generated for the 3-segment CFOF sequence which includes random prefix and suffix portions, and the fourth FM signal phase plot 74 is generated for the 3-segment CFOF sequence which includes random prefix and suffix portions. With the desired waveform shown with x's in the zoomed or enlarged left end view 75 and right end view 76, it can be seen from the FM signal phase plots 73, 74 that the random prefix/suffix portions will create uncertainty at one or both ends which degrades CFO estimation. In particular, the zoomed left end view 75 shows there is divergence for both the FM signal phase plots 73, 74 having random prefix/suffix portions, while the zoomed right end view 76 shows there is divergence for the FM signal phase plot 73 having random prefix/suffix portions.

As shown with the FM signal phase waveform plots 73, 74, if multiple signature segments are used in a CFOF sequence which includes random prefix/suffix portions, the phase trajectories for the edge segments may wander since the random nature of the prefix/suffix portions prevents the receiver from knowing the values of the bits adjacent to the outer segments. To prevent degraded estimation accuracy, each edge segment (e.g., the first or third signature segment in a 3-segment CFOF sequence) will require its own reference waveform for detection, thereby requiring a total of up to 3 reference waveforms. However, and as shown with the first FM signal phase plot 71, by generating the CFOF sequence to include prefix and suffix portions which conform to the structural requirements of the present disclosure, only one reference waveform will be required for detecting all the individual signature segments.

While the depicted the FM signal phase waveform plots 70 provide two examples of how the phase trajectories wander with a CFOF sequence using random prefix/suffix for an FM modulator using a Gaussian pulse with h=½ and BT=½, it will be appreciated that the impact of the random prefix/suffix can be more severe as the uncertainty at the edges of the CFOF sequence increases. For example, with Gaussian pulse parameters h=½ and BT=0.3, there is more inter-symbol interference (ISI) due to the wider frequency pulse (BT=0.3) which can cause greater phase divergence at either the left or the right or both ends of the CFOF sequence.

Figure 8:
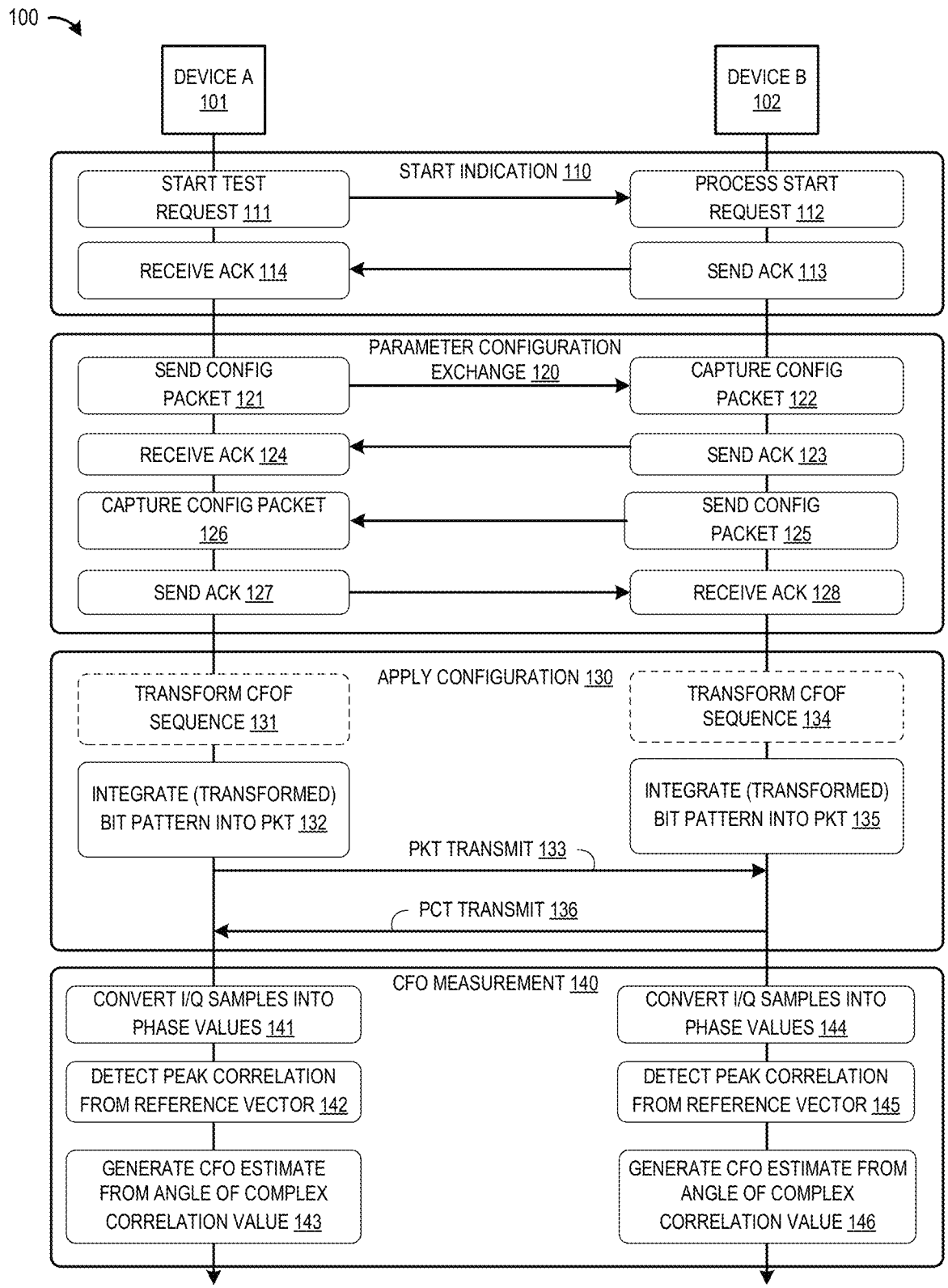
FIG. 8 is a simplified block diagram of a wireless communication system which uses multi-stage processing steps for implementing CFO estimation in accordance with selected embodiments of the present disclosure.

For an improved understanding of selected embodiments of the present disclosure, reference is now made to FIG. 8 which illustrates a simplified block diagram of a wireless communication system 100 which uses multi-stage processing steps 110, 120, 130, 140 for implementing CFO estimation. As depicted, the wireless communication system 100 includes a first wireless device (Device A) 101 and a second wireless device (Device B) 102. As will be appreciated, the wireless communication system 100 is generally configured to compute or estimate the carrier frequency offset between the LO clocks at the wireless devices 101, 102 by employing a multi-stage CFO estimation protocol which proceeds through a start indication stage 110, a parameter configuration exchange stage 120, a configuration application stage 130, and a CFO measurement stage 140 for computing and reporting an estimated carrier frequency offset between the wireless devices.

Though additional details are provided hereinbelow, a generalized overview of the multi-stage CFO estimation protocol shown in FIG. 8 starts with the start indication stage 110 where the first wireless device 101 sends an indication to a second wireless device 102 that a CFO measurement is being initiated. In addition or in the alternative, the second wireless device 102 may also send a start indication to the first wireless device 101. As disclosed herein, the start indication may be sent in a general protocol packet. During the parameter configuration exchange stage 120, either or both wireless devices 101, 102 may send configuration packets which specify the content the CFOF sequence (e.g., the number of signature segments and the bit pattern of the signature segment(s)), the number of CFOF sequences, and the location of the CFOF sequence in a CFO measurement packet being transmitted by the wireless devices. As disclosed herein, the configuration packet may be a general protocol packet. During the configuration application stage 130, either or both wireless devices 101, 102 may apply any required transformation of the CFOF sequence (e.g., whitening) and insert or integrate the (transformed) CFOF sequence into one or more CFO measurement packets for transmission to the other wireless device. As disclosed herein, the CFO measurement packet may be a general protocol packet wherein the (transformed) CFOF sequence is inserted at the specified location (e.g., in the PDU field or using the Access Address field). During the CFO measurement stage 140, either or both wireless devices 101, 102 are synchronized to process samples received from CFO measurement packet and compared to a reference vector to detect a peak correlation and compute a CFO estimate from the peak correlation value. Subsequently, the wireless device(s) 101, 102 apply one or more data processing steps to use the CFO estimate with localization applications, authentication applications, and the like.

To initiate the CFO estimation protocol, the start indication stage 110 may begin when the first device 101 issues a start test request (step 111) which may be sent to the second device 102 using a general protocol packet. At the second device 102, the start request is processed (step 112), and then the second device issues and transmits an acknowledge (ACK) message (step 113) to the first device 101. As will be appreciated, the acknowledgement 113 may take any suitable form, and the acknowledge establishes an agreement between the devices 101, 102 to measure the CFO. In selected embodiments, the first device 101 may be configured to automatically re-transmit the start test request 111 if an acknowledge message (ACK) 113 is not received within a specified response period.

In the parameter configuration exchange stage 120 of the CFO estimation protocol, the first device 101 configures the second device 102 to make a CFO measurement at the second device 102. In selected embodiments, the first device 101 implements the parameter configuration of the second device 102 by sending a configuration packet 121 to the second device 102. In selected embodiments, the configuration packet may be a general protocol packet. At the second device 102, the configuration packet is captured (step 122), and then the second device issues and transmits an acknowledge (ACK) message (step 123) to the first device 101 where it is received (step 124). In selected embodiments, the configuration packet is generated at the first device 101 to specify for the second device 102 the content, number, and location of the CFOF sequence that will be transmitted in a subsequent CFO measurement packet. For example, the transmitted configuration packet 121 may specify the number of CFOF sequences to be used in the CFO estimation process. In addition, the transmitted configuration packet 121 may specify the actual bit patterns used in each CFOF sequence, such as by specifying the entire bit pattern of the CFOF sequence, or by specifying the bit pattern of the signature segment portion of the CFOF sequence, or by specifying at least the bit pattern of a signature segment and the number of segments (Nseg) in the CFOF sequence. The transmitted configuration packet 121 may also specify the exact location of the CFOF sequence within the CFO measurement packet. As an alternative to including the full CFOF sequences in the transmitted configuration packet 121, the first device 101 could pass a token for each CFOF sequence to be used, and the second device could use the token(s) to obtain the CFOF sequence(s) using any suitable generation technique, such as a lookup table technique. In another alternative to including the full CFOF sequences in the transmitted configuration packet 121, the CFOF sequences could be pre-negotiated or known a priori, thereby removing the need for the parameter configuration steps 121, 122. While the bit patterns of any prefix and suffix portions of the CFOF sequence could also be specified in the configuration packet, this can be avoided by defining the prefix/suffix values to have a known value that is known a priori to the second device 102. For example, the prefix could be defined as an m-bit value that is identical to the last m bits of the signature segment in the CFOF sequence, and the suffix could be defined as an m-bit value that is identical to the first m bits of the signature segment in the CFOF sequence.

With the processing steps 121-124, the first device 101 configures the second device 102 to make a CFO estimate. In addition or in the alternative, the device roles may be reversed so that the second device 102 configures the first device 101 to make a CFO estimate. In this switched role, the second device 102 configures the first device 101 by sending a configuration packet 125 to the first device 101 where the configuration packet is captured (step 126) before the first device issues and transmits an acknowledge (ACK) message (step 127) to the second device 102 where it is received (step 128).

In the configuration application stage 130 of the CFO estimation protocol, the first device 101 may optionally transform the CFOF sequence 131, where the optional nature of this step is indicated with the dashed lines. For example, if the only FEC processing of any CFO measurement packet is the attachment of a CRC field, then there is no transformation processing required. However, if the CFO measurement packet will undergo whitening, then each CFOF sequence that will be a part of the PDU must undergo a transformation 131 prior to insertion in the PDU of the CFO measurement packet. If this transformation is not performed, but the CFOF sequence is inserted as is in the PDU which is input to the whitening step, then the output of the whitener will no longer contain the desired CFOF sequence; secondly, if multiple identical signature segments are used, then the identical nature of multiple signature segments within a CFOF sequence will also be destroyed. In addition, any predetermined relationships shared by the prefix and suffix with the signature segment(s) will also be violated. While any suitable transformation process may be applied to the CFOF sequence at step 131, an example transformation of a CFOF sequence which will be inserted in the PDU prior to whitening may be implemented by first passing only the CFOF sequence through a whitener (LFSR) by setting the initial state of a linear feedback shift register (LFSR) to correspond to the CFOF sequence's starting point within the PDU and then taking the whitened CFOF sequence and inserting it in the PDU. When the entire PDU is eventually whitened in the PHY, the desired CFOF sequence(s) will reappear at the whitener output before being modulated and sent over-the-air.

The configuration application stage 130 also implements the CFO estimation protocol by integrating or inserting the CFOF sequence or bit pattern into the CFO measurement packet (step 132). If the CFOF sequence was transformed at step 131, then the transformed CFOF sequence is integrated into the CFO measurement packet at step 132. As disclosed herein, the CFO measurement packet may be a general protocol packet such as a BLE packet. As disclosed herein, the (transformed) CFOF sequence may be inserted anywhere in the CFO measurement packet, provided that the placement location is specified in the configuration packet which notifies the receiving/measuring device. In selected embodiments, the entirety of the CFOF sequence (including prefix, signature segment(s), and suffix) is inserted in the PDU portion of the CFO measurement packet. Since the PDU field generally includes a header for conveying field parameters (e.g., PDU length, type, version, etc.), the CFOF sequence can be placed in the variable length fields or any other location in the PDU that does not encroach into header. In other embodiments, a CFOF sequence which includes a single signature segment is inserted so that the signature segment is inserted in the SFD field (a.k.a., Access Address (AA) field in BLE standards), the prefix is inserted in the portion of the preamble adjacent to the SFD/AA, and the suffix is inserted into a portion of the PDU adjacent to the SFD/AA. HADM is a special case of this configuration.

After assembling the CFO measurement packet at step 132, the first device 101 transmits the CFO measurement packet 133 to the second device 102 where it is received and processed in the CFO measurement stage 140 to compute CFO estimation values. As will be appreciated, any suitable packet transfer process may be used to convey the CFOF sequence in the transmitted CFO measurement packet 133. For example, the first device 101 may be configured to transmit the CFO measurement packet 133 during a packet transmission window specified in the configuration packet 121. In addition, the second device 102 may be configured to receive and process the CFO measurement packet 133 by processing the preamble portion to detect the existence of the CFO measurement packet 133, and by processing the AA portion and/or PDU portion to detect the CFOF sequence in the CFO measurement packet 133 based on the packet location information specified in the configuration packet 121.

As seen from the foregoing, the processing steps 131-133 are performed at the first device 101 to send a measurement packet to the second device 102 for use in making a CFO measurement. In addition or in the alternative, the device roles may be reversed so that the second device 102 generates and transmits the CFO measurement packet 136 to the first device 101 to make a CFO measurement. In this switched role, the second device 102 optionally transforms the CFOF sequence at step 134, and then integrates the (transformed) CFOF sequence into the CFO measurement packet at step 135 for transmission to the first device 101 as the CFO measurement packet 136.

In the CFO measurement stage 140 of the CFO estimation protocol, the configured second device 102 may extract the CFOF sequence from the received CFO measurement packet 133 using any suitable decoding processing. For example, the second device 102 may operate in a radio receive mode to capture the received CFO measurement packet 133 as IQ data samples, and may pre-process the IQ samples by converting them into phase values 144. For example, a processing module at the second device 102 may be selectively enabled during the CFOF sequence to convert the input IQ samples into phase values by discriminating the input, and then calculating the phase change over each symbol duration. The second device 102 may also be configured to detect a peak correlation in the phase values using a reference vector 145. To this end, a CFOF signature segment detector at the second device 102 may be selectively triggered at the end of each signature segment in the CFOF sequence to apply a reference vector (based on the signature segment) to detect each segment's peak correlation. Using the peak correlation, the second device 102 may then generate a CFO estimate from the angle of the complex correlation value 146.

As seen from the foregoing, the processing steps 144-146 are performed at the second device 102 to compute the CFO estimate between the LO carrier frequencies of the first and second devices 101, 102. In addition or in the alternative, the device roles may be reversed so that the first device 101 generates a CFO estimate based on the CFO measurement packet 136 sent by the second device 102. In this switched role, the first device 101 receives and captures the CFO measurement packet 136 as IQ data samples, converts the IQ samples into phase values 141, detects a peak correlation in the phase values using a reference vector 142, and generates a CFO estimate from the angle of the complex correlation value 143.

Figure 9:
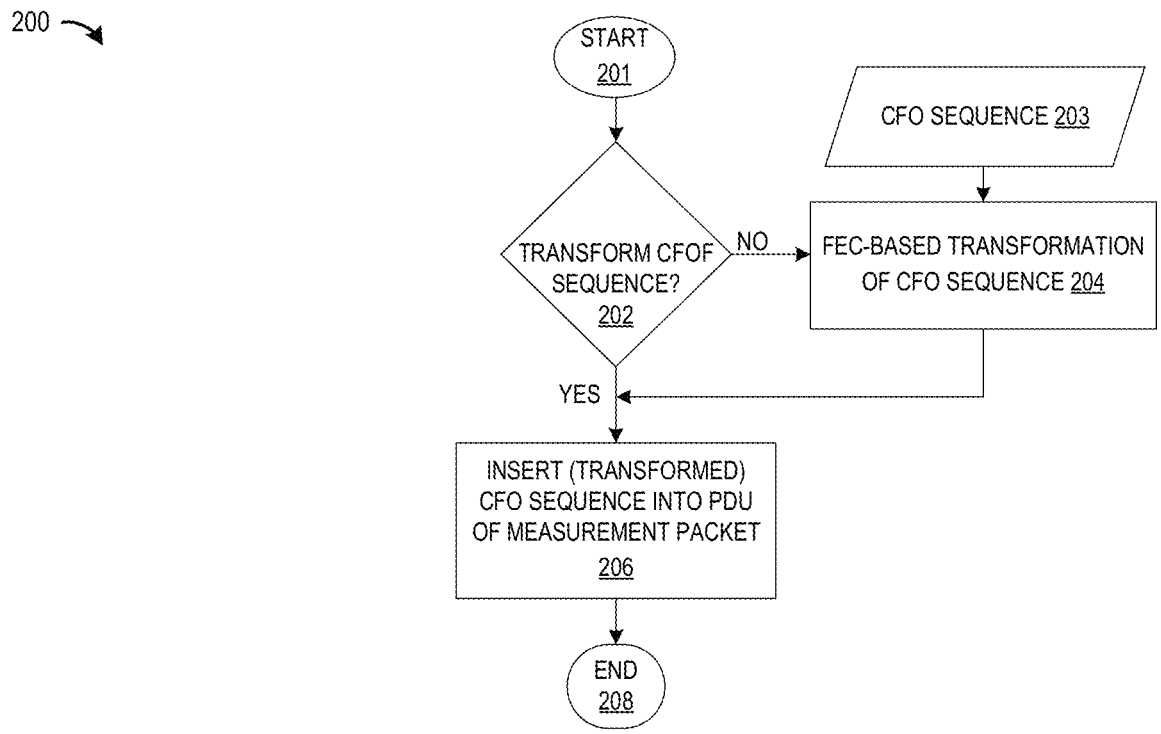
FIG. 9 illustrates a simplified flow chart of the process used to generate a CFO measurement packet by applying configuration parameters in accordance with selected embodiments of the present disclosure.

For an improved understanding of selected embodiments of the present disclosure, reference is now made to FIG. 9 which illustrates a simplified flow chart of the sequence 200 used by a transmitting wireless device (e.g., Device A) to generate a CFO measurement packet by applying configuration parameters. When the CFO measurement packet is received by the receiving wireless device (e.g., Device B), a CFO measurement can be made since the receiving wireless device was previously configured with the configuration parameters to correctly decode the CFO measurement packet and extract the CFOF sequence. As will be appreciated, if the transmitting wireless device (e.g., Device A) will also make a CFO measurement, then the other wireless device (e.g., Device B) may also need to perform a similar transformation at its end before sending the CFO measurement packet to the transmitting wireless device (Device A).

Once the depicted process flow starts (step 201), the transmitting wireless device decides whether a transformation of the CFOF sequence is required at step 202 by evaluating the configuration parameters to determine the placement and processing of the CFOF sequence in the measurement packet. If the evaluation step determines that CFOF sequence is located in the measurement packet's SFD/AA field, then no transformation of the CFOF sequence(s) is required (negative outcome to decision step 202), and the CFOF sequence is directly inserted into the CFO measurement packet (step 206). In this case, the CFOF sequence may include a single (Nseg=1) signature segment, in which case the transmitting wireless device performs step 206 by inserting the CFOF sequence bit pattern into the SFD/AA field of the measurement packet, along with the required prefix and suffix portions on each side of the CFOF sequence.

In addition, the evaluation step 202 may determine whether the CFOF sequence is located in the PDU field of the measurement packet, in which case the transmitting wireless device evaluates the forward error correction (FEC) for the transmit modulation scheme at step 202 to determine if the FEC uses a simple CRC attachment technique or not. If the FEC scheme uses a simple CRC attachment technique, then no transformation of the CFOF sequence(s) is required (negative outcome to decision step 202), and the CFOF sequence is directly inserted into PDU field of the measurement packet (step 206). However, if the FEC scheme does not use a simple CRC attachment technique, then a transformation of the CFOF sequence is required (affirmative outcome to decision step 202). In this case, the transmitting wireless device's link layer may perform a transformation (based on its FEC mechanism) of the CFOF sequence(s) at step 204 before it is inserted in the CFO measurement packet. For example, if the FEC processing uses whitening (e.g., BLE 1 Mbps, BLE 2 Mbps PHYs), each CFOF sequence must first undergo a round of whitening (step 204) before it is inserted in the PDU. To this end, the CFOF sequence 203 is retrieved and processed for whitening at step 204 by setting the initial state of the LFSR to correspond to its starting point within the PDU. Care must be taken to set the initial state of the LFSR to correspond to the beginning point of the bit pattern within the PDU. When the entire PDU is eventually whitened in the PHY, the desired CFOF sequence(s) will reappear at the whitener output before being modulated and sent over-the-air. In another example, if the FEC scheme uses a convolutional code, then the space of allowed bit patterns becomes limited, but the transformation step 204 can still account for the convolutional coding, though with additional complexity in the transformation processing step 204.

Figure 10:
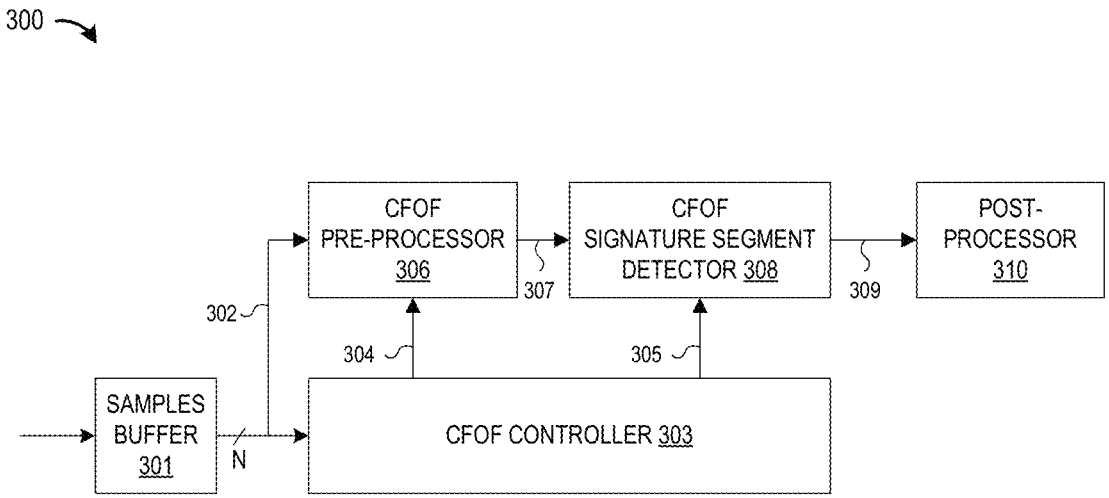
FIG. 10 depicts a simplified block diagram of a CFOF sequence detector in accordance with selected embodiments of the present disclosure.

For an improved understanding of selected embodiments of the present disclosure, reference is now made to FIG. 10 which depicts a simplified block diagram of a CFOF sequence detector 300 which performs a high resolution, over-the-air measurement of carrier frequency offset by processing a received CFO measurement packet which contains a CFOF sequence. As depicted, the CFOF sequence detector 300 includes an CFOF controller 303, a CFOF pre-processor 306, a CFOF signature segment detector 308 which are configured to estimate a carrier frequency offset value between local oscillator clocks in different wireless devices. The CFOF sequence detector 300 is connected to an input sample buffer 301 which stores IQ data samples for a received CFO measurement packet which is transmitted from a first device to a second device (or vice versa). The transmitted CFO measurement packet may be a well-formed packet, such as a BLE packet, which includes a preamble, access address and payload. By processing the received CFO measurement packet IQ data samples, the second device calculates a carrier frequency offset for use in synchronizing with the first device. As described more fully hereinbelow, an optimized implementation of the CFO estimation system, circuit, and method will use the same reference vector with every signature segment to simplify the design of the CFOF sequence detector 300. And by knowing the location of the CFOF sequence in the measurement packet, the power consumption of the CFOF detector 300 can be reduced.

In operation, the CFOF controller 303 is connected and configured to provide control signals 302, 305 to the CFOF pre-processor 306 and a CFOF signature segment detector 308 for selectively enabling and disabling their operation based on the known location of each CFOF sequence in the PDU of the CFO measurement packet. If the CFOF sequence is in the PDU, then the controller can be turned ON after AA detection to synchronize it with the start of the PDU. In this case, it would get a start signal from the AA detector. However, in HADM etc., the controller is not really required as the AA detector can operate on its own.

When enabled by the control signal 304, the CFOF pre-processor 306 is configured to convert the received input I/Q samples 302 into phase values by discriminating the input, and then calculating the phase change over each symbol duration. The detected phase change values are output as a sequence of output values 307 to the CFOF signature segment detector 308. To control the timing and reduce power consumption, the input control signal 304 enables the CFOF pre-processor 306 at the beginning of the CFOF sequence and disables the CFOF pre-processor 306 at the end of the CFOF sequence.

In similar fashion the CFOF signature segment detector 308 is controlled by the input control signal 305 to use a reference vector (based on the signature segment) to detect each segment's peak correlation and a CFO estimate is produced from the angle of the complex correlation value. In particular, the input control signal 305 controls the timing and reduces the power consumption by precisely triggering CFOF signature segment detector 308 at the end of each signature segment. The CFO estimate values 309 are output to the post-processor 310 where they may be used with any suitable clock synchronization application where the local clock oscillator is to be synchronized with the local clock oscillator of another device.

As will be appreciated, examples of clock synchronization applications that can be executed by the post-processor 310 using the CFO estimate values 309 include, but are not limited to, localization applications, authentication applications, and the like. For example, the CFO estimation techniques disclosed herein are generally applicable to BLE, ANT and other similar narrowband wireless protocols employing continuous-phase frequency modulation techniques (e.g., GFSK, FSK, IEEE 802.15.4g O-QPSK PHY), and are very useful in localization applications (such as distance estimation using Round-Trip Time (RTT) measurements or phase-based techniques), as well as direction finding techniques (such as angle-of-arrival/angle-of departure).

Other clock synchronization applications that can be executed by the post-processor 310 using the CFO estimate values 309 include authentication applications which use the fine CFO estimate values 309 as a metric for authenticating communication with a known peer device. For example, a precise knowledge of the CFO between two devices may enable authentication of each other's transmissions and thwart spoof-attacks under different conditions. For example, an attacker having a different CFO from that of a partner device may be identified as a threat attack when the attacker has no knowledge that CFO is being used as a means of device identification. This can be specially enforced in security-critical applications where wireless devices can use temperature-compensated reference oscillators which can maintain a fixed carrier frequency offset between them. The targeted accuracy of fine CFO estimation needs to be low enough, such that its measurement accuracy is better than typical trim resolution/variability of a reference oscillator (<1 ppm).

Figure 11:
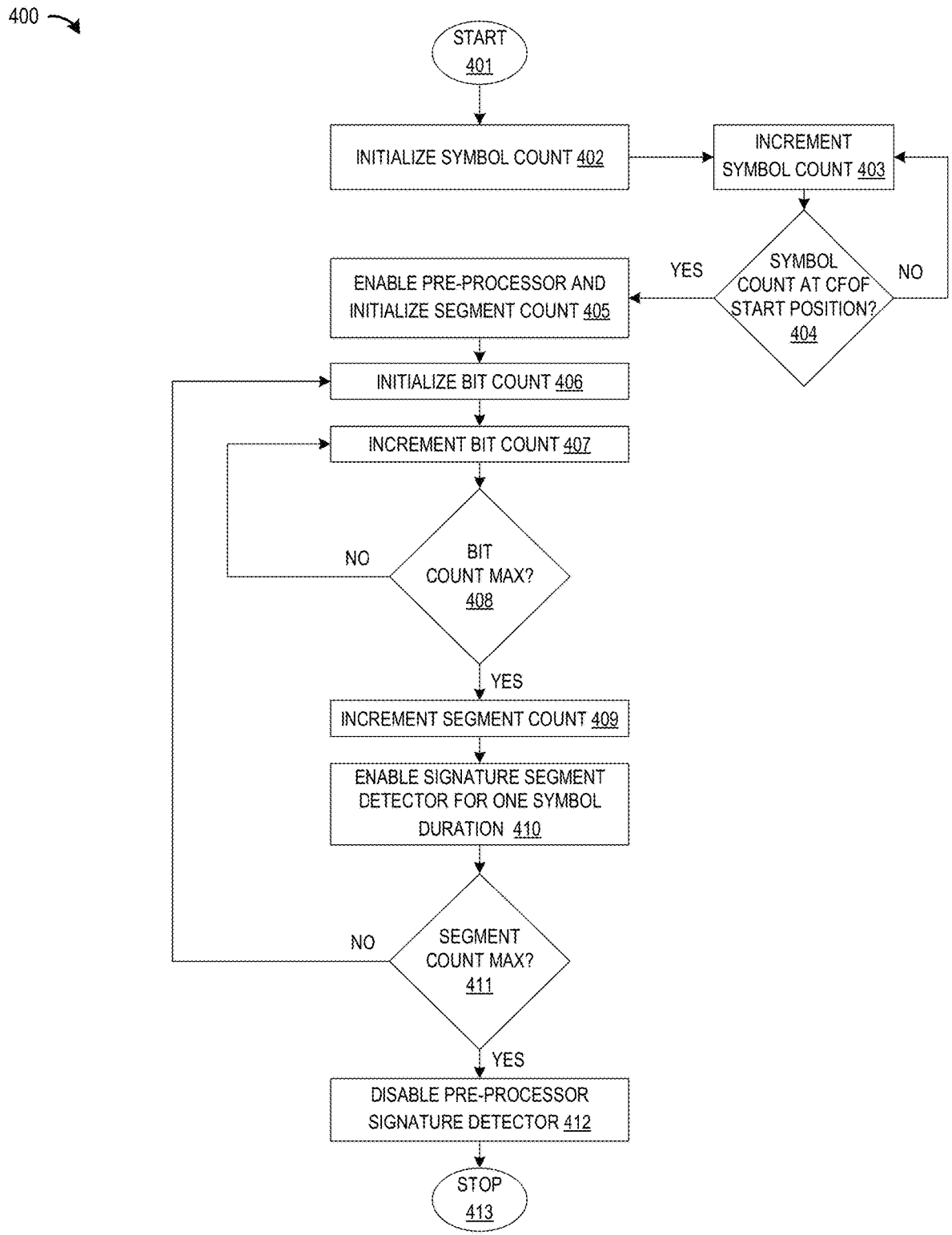
FIG. 11 depicts a simplified flow chart showing the logic for the operation of a CFOF controller which controls the enablement of the CFOF sequence detector based on the location of each CFOF sequence in the CFO measurement packet in accordance with selected embodiments of the present disclosure.

To provide additional details for an improved understanding of selected embodiments of the present disclosure, reference is now made to FIG. 11 which depicts a simplified flow chart 400 showing the logic for the operation of a CFOF controller which controls the enablement of the CFOF sequence detector based on the location of each CFOF sequence in the CFO measurement packet. Once the control sequence starts (step 401), a symbol count value (e.g., sym_cnt) is initialized to a start value (sym_cnt=0) at step 402. At step 403, the symbol count value is incremented (sym_cnt=sym_cnt+1) before detecting at step 404 whether the symbol count value matches the CFOF sequence start position value (e.g., sym_cnt=cfof_start_pos) specified in the configuration parameter values. If not (negative outcome from step 404), then the symbol count value is incremented again (step 403) and the detection loop continues until the symbol count value matches the CFOF sequence start position value (affirmative outcome from step 404). At this point, a CFOF sequence is present at the input buffer, so the CFOF controller enables the CFOF pre-processor and input buffer at step 405 to begin processing the CFOF sequence, including initializing a signature segment count value to a start value (e.g., seg_cnt=0).

To monitor the CFOF sequence processing, the CFOF controller begins by initializing a bit count value (e.g., bit_cnt=0) at step 406. At step 407, the bit count value is incremented (bit_cnt=bit_cnt+1) before detecting at step 408 whether the bit count value matches a maximum or predetermined bit count length (bit_cnt=32) specified in the configuration parameter values. If not (negative outcome from step 408), then the bit count value is incremented again (step 407) and the detection loop continues until the maximum/predetermined bit count length is reached (affirmative outcome from step 408). At this point, a CFOF pre-processor has detected a signature segment, so the CFOF controller increments the segment count value (seg_cnt=sym_cnt+1) at step 409 and enables the CFOF signature segment detector at step 410 for one symbol duration to begin processing the detected signature segment.

At step 411, the CFOF controller detects whether the signature segment count value matches the maximum number of signature segments (cfof_num_seg) specified in the configuration parameter values. If not (negative outcome from step 411), then there are additional signature segments to process, so the bit count in re-initialized (step 406) and steps 407-411 are iteratively repeated until the signature segment count value matches the maximum number of signature segments (seg_cnt=cfof_num_seg) (affirmative outcome to step 411). At this point, processing of the CFOF sequence is completed, so the CFOF controller disables the CFOF pre-processor, input buffer, and CFOF signature segment detector at step 412. At step 413, the control sequence stops.

Figure 12:
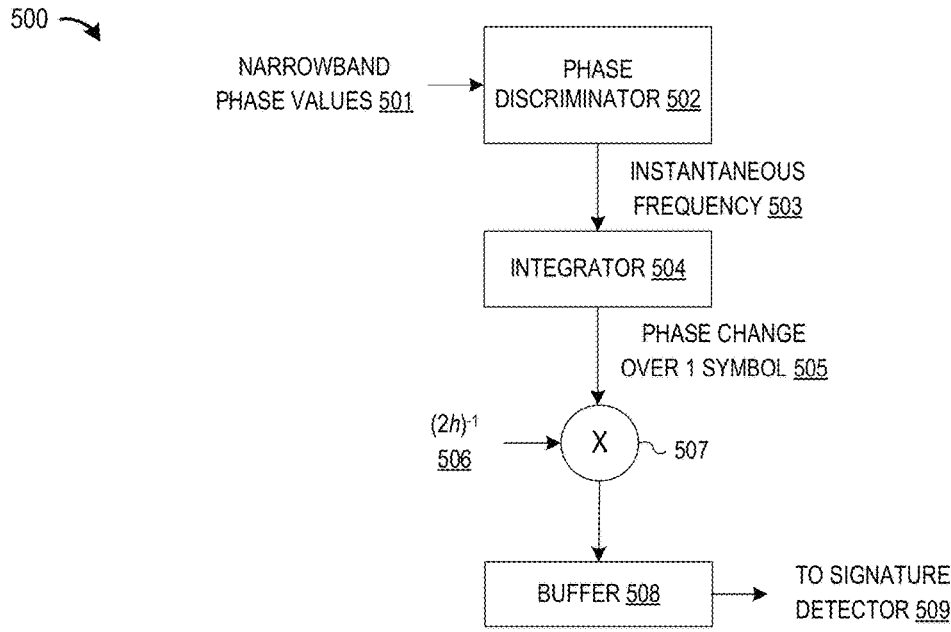
FIG. 12 depicts a simplified block diagram of a CFOF pre-processor in accordance with selected embodiments of the present disclosure.

To provide additional details for an improved understanding of selected embodiments of the present disclosure, reference is now made to FIG. 12 which depicts a simplified block diagram of a CFOF pre-processor 500 which converts the input I/Q samples into phase values under control of the CFOF controller so as to be selectively enabled only when the CFOF sequence is in the input narrowband phase samples. As depicted, the CFOF pre-processor 500 is connected to receive input narrowband phase samples 501 generated upon reception of the CFO measurement packet. The input narrowband phase samples 501 are differentiated by the phase discriminator 502 to produce instantaneous frequencies 503, and then integrated by the integrator 504 to calculate a phase change over each symbol duration 505. For example, when the sampling rate is 4 times the modulated symbols rate, the integrator 504 may use a sliding window of 4 samples to integrate each group of 4 consecutive instantaneous frequency input values 503 to calculate the corresponding phase change over one symbol duration 505. In an optional step, a multiplier 507 scales the phase values by a constant equal to 1/(2h), where h is the modulation index. The scaling step is designed to accommodate large modulation indexes. The output from the multiplier 507 is passed to a buffer 508, such as a 128-tap FIFO, and the buffer 508 output gets passed to the signature detector 509.

Figure 13:
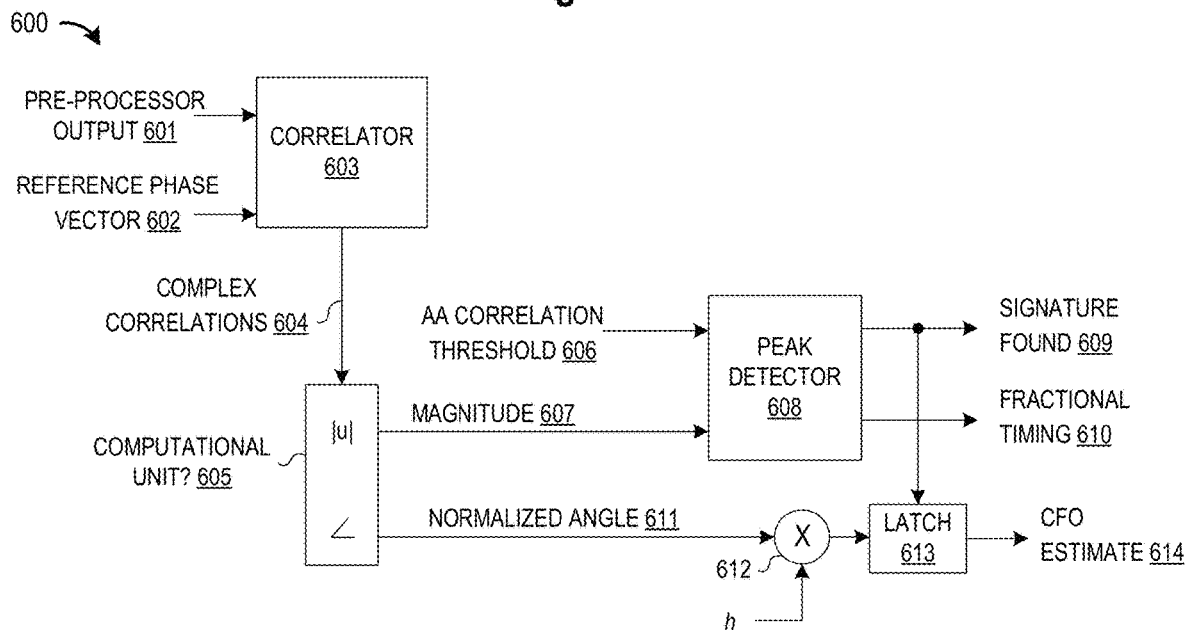
FIG. 13 depicts a simplified block diagram of CFOF signature segment detector in accordance with selected embodiments of the present disclosure.

To provide additional details for an improved understanding of selected embodiments of the present disclosure, reference is now made to FIG. 13 which depicts a simplified block diagram of a CFOF signature segment detector 600 which uses a detected peak correlation for each signature segment in the received CFOF sequence to compute a CFO estimate under control of the CFOF controller so as to be selectively enabled only at the end of each signature segment. As depicted, the CFOF signature segment detector 600 is connected to receive the CFOF pre-processor output values 601 as an input to a correlator 603. For example, the CFOF pre-processor output values 601 may be provided as buffered output phase values from the CFOF pre-processor. In addition, the correlator 603 is connected to receive the reference phase vector 602. For example, the input reference phase vector 602 may be provided as a 32×1 reference phase vector if the signature segment is 32 symbols long.

When the last bit of each signature segment is due to arrive, the CFOF controller enables the correlator 603 for exactly one symbol duration (e.g., four sample clocks) to calculate the four complex correlations 604 corresponding to the four sample instants. In an example embodiment, the correlator 603 calculates the complex correlations 604 by subtracting the reference phase vector 602 from the buffered output from the pre-processor 601, converting the result to a 32×1 vector of I/Q values, and then calculating their mean.

From the highest among the complex correlation values 604, the CFOF signature segment detector 600 computes the CFO estimate 614 by calculating the angle of the complex correlation. To this end the CFOF signature segment detector 600 may include a first computational unit 605 which is connected to process the complex correlation values 604 to obtain the magnitude ($|u|$) and angle ($\angle$) of the complex correlation. While any suitable method may be used, the first computational unit 605 may compute the correlation angle ($\angle$) using a CORDIC algorithm or any other suitable method. In addition, the first computational unit 605 may compute the magnitude ($|u|$) of each complex correlation value 604, $z=a+jb$, using a simple approximation, such as making the following computations:

$$\text{MIN} = \min(|a|, |b|) \quad 1.$$

$$\text{MAX} = \max(|a|, |b|) \quad 2.$$

$$|z| = \max(\text{MAX}, (7/8)*\text{MAX} + (17/32)*\text{MIN}) \quad 3.$$

As depicted, the first computational unit 605 is connected to provide the magnitude ($|u|$) 607 to a peak detector circuit 608 which locates each segment's peak correlation and generates a corresponding the signature segment 609 and fractional timing value 610. When CFOF sequence is in the AA, then the peak detector 608 may use an AA correlation threshold value which must be exceeded for a successful detection. Alternatively, if the CFOF sequence is in the PDU, then the peak detector circuit 608 may simply select the highest correlation value.

In cases where the CFOF pre-processor scales the phase values by a constant equal to 1/(2h), the depicted first computational unit 605 may be connected to provide the normalized angle ($\angle$) 611 to a multiplier circuit 612 where it is scaled by the modulation index factor h. With the output of the multiplier 612 stored in the latch 613, the CFOF signature segment detector 600 outputs the CFO estimate 614 corresponding to the peak identified by the peak detector 608. However, if the CFOF pre-processor does not scale the phase values by a constant equal to 1/(2h), then the first computational unit 605 may provide the normalized angle ($\angle$) 611 directly to the output latch 613.

Figure 14:
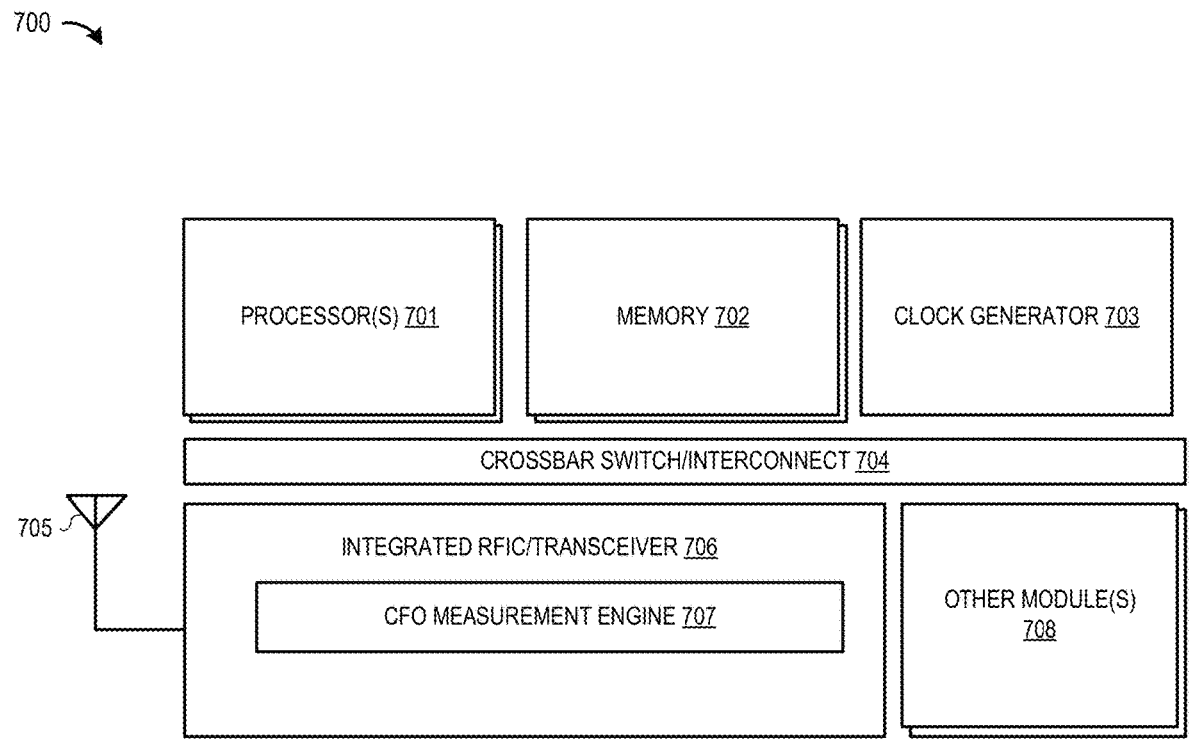
FIG. 14 is a simplified block diagram of a wireless radio microcontroller module which performs a carrier frequency offset estimation protocol in accordance with selected embodiments of the present disclosure.

To provide additional details for an improved understanding of selected embodiments of the present disclosure, reference is now made to FIG. 14 which is a simplified block diagram of a wireless radio microcontroller module 700 which performs a carrier frequency offset estimation protocol using one or more defined signature sequences having a well-defined prefix, signature segment(s) and suffix components that are included in a measurement packet. As depicted, the wireless radio microcontroller module 700 may be implemented in whole or in part as a single integrated circuit that enables Bluetooth, Bluetooth Low Energy, IEEE 802.15.4 and/or Generic FSK connectivity for automotive, and industrial embedded systems. As illustrated, the wireless radio microcontroller module 700 integrates one or more control processor or central processing unit (CPU) subsystems 701, one or more memory modules 702 and a clock generator 703 connected over a crossbar switch or interconnect 704 to an RF integrated circuit (RFIC)/transceiver interface 706 and one or more other modules 708.

In selected embodiments, the CPU subsystem(s) 701 may be embodied as an Arm® Cortex-M class CPU or any other suitable type of processing circuit, including but not limited to a microprocessor (MPU), microcontroller (MCU), digital signal processor (DSP), or another type of processor or processor core. The control processor(s) 701 may be connected over the interconnect 704 to access the integrated RFIC/transceiver 706 which to implements the CFO measurement engine 707. In addition or in the alternative, the control processor(s) 701 may be connected to the memory modules 702 to access data and/or instructions when the CFOF estimation scheme is implemented in software. Alternatively, a hardware implementation of the CFOF estimation scheme may use flip-flop memory that is spread over the sea of gates, rather than a distinct RAM/ROM/Flash block. Accordingly, the memory 702 can be volatile memory such as a memory buffer built using discrete flip-flops, random-access memory (RAM), non-volatile memory such as flash memory, or a combination thereof. Though not shown in detail, the additional modules 708 may include peripheral devices or special-purpose processors, communication interfaces, timers, encoders/decoders, and one or more external memory interfaces, such as serial busses (such as UART, USB, etc.), DDR interface or flash interface. In turn, the external memory interfaces may be connected to external memory, such as DDR memory or flash memory. In addition, the interconnect 704 can be any type of bus structure, including but not limited to a non-coherent interconnect, an advanced high-performance bus (AHB), or an advanced peripheral bus (APB).

To support device operations, the clock generator 703 may include one or more internal reference clocks, frequency-locked loop units, and reference or local oscillator(s). Each internal reference clock can be used as a clock source for other on-chip peripherals. In operation, the clock generator 703 is generally configured to provide clock signals to synchronize operations of the transceiver 706. In at least one embodiment, the clock generator 703 is an adjustable clock source, whereby a control module (not shown) can change the frequency of the clock signal provided by the clock generator 703. The clock generator 703 can thus be adjusted to synchronize with the clock of another radio, such as the transceiver of a peer wireless device (e.g., a reflector device).

The RFIC interface/transceiver interface 706 may include RF/analog circuitry (e.g., filters, amplifiers, analog-to-digital converters, digital-to-analog converters, etc.) that is embodied as a 2.4 GHz radio that supports Bluetooth, Bluetooth LE, IEEE 802.15.4 and/or Generic FSK modulations. In addition, the RFIC interface/transceiver interface 706 may include a carrier frequency offset measurement engine 707 which may be implemented with a hardware accelerator which converts input I/Q or phase samples into phase change values over each symbol duration, and the uses a reference vector (based on the signature segment) to detect each segment's peak correlation so that a CFO estimate is computed from the angle of the complex correlation value. In addition, the RFIC interface/transceiver interface 706 is a wireless radio generally configured to provide at least a physical (PHY) and link layers for wireless communication according to one or more wireless protocols such as BT, BLE, IEEE 802.15.4, and GFSK protocols. The RFIC interface/transceiver interface 706 may further be configured to receive a parameter configuration packet with specified control parameters for decoding one or more CFOF sequences, to capture IQ samples from a received CFO measurement packet which includes one or more CFOF sequences, and to process the IQ samples into phase change values which are correlated with a reference vector (based on the signature segment) to detect each segment's peak correlation so that a CFO estimate is computed from the angle of the complex correlation value.

As will be appreciated, the high-accuracy carrier frequency offset (CFO) estimation system, circuit, and method described herein for enabling highly accurate CFO estimation between two devices by generating a measurement protocol packet to include a predetermined bit sequence (a.k.a., CFOF) with a known prefix, signature element(s), and suffix components can be adjusted or modified to provide a higher level of accuracy that is required for phase-based distance estimation. In addition, the level of CFO estimation accuracy can be controlled or adjusted since the predetermined bit sequence may also be flexibly adjusted to embed fewer or more known sequences in the PDU. By properly defining the structure of the predetermined bit sequence, a highly flexible CFO estimation technique is provided with minimal disruption to the protocol procedures in both the PHY and link layers. For example, by inserting more signature segments in the predetermined bit sequence sent in the measurement protocol packet and generating one CFO estimate from each signature segment, the level of accuracy can be increased through averaging of CFO estimates derived from the signature segments contained in the same packet. Additional accuracy can be obtained by using multiple predetermined bit sequences so that the CFO estimates from the individual ones can be collected and again averaged to further improve the accuracy. Additional flexibility is provided by allowing the two wireless devices to negotiate the exact bit sequences and/or their location in the measurement protocol packet. And by using identical signature segments within a predetermined bit sequence, a single reference vector could be used in the signature segment detector for all of the identical signature segments. Even across multiple instances of predetermined bit sequences, the signature segment could be the same, thereby keeping the receiver complexity low. So by using multiple segments within one CFOF sequence and/or using multiple CFOF sequences, it is possible to improve the estimation accuracy in a flexible manner while keeping the complexity low. Compared to conventional methods which use hundreds of packets to estimate the carrier frequency offset, the use of a single measurement protocol packet having the predetermined bit sequence can reduce the number of packets to no more than a few (including any start up and parameter configuration packets), thus achieve huge reductions in the measurement time.

By now, it should be appreciated that there has been provided a method, apparatus, and system for estimating a carrier frequency offset between first and second wireless devices in a wireless network. In the disclosed methodology and system, the first wireless radio device may begin the CFO estimation process by sending a start indication packet to the second wireless device. Subsequently, the second wireless device may be configured based on one or more configuration parameters for a carrier frequency offset fingerprint (CFOF) sequence that is subsequently received in a measurement packet, where the measurement packet includes at least one carrier frequency offset fingerprint (CFOF) sequence which includes a prefix component, one or more signature segments, and a suffix component. The configuration parameters may also specify how many CFOF sequences will be received by the second wireless device. While the configuration parameters may be known a priori to the second wireless device, the second wireless device may also be configured by receiving a parameter configuration packet with the configuration parameters. Subsequently, the second wireless device receives, from the first wireless device, a measurement packet with the CFOF sequence. The received measurement packet may be a BLE packet including a preamble, an access address, and a data payload with the one or more signature segments located entirely in the access address or in the data payload. In selected embodiments of the CFOF sequence, each signature segment is an L-bit sequence with m first bits and m last bits, the prefix component is at least m-bits long and is identical to the m last bits of the L-bit sequence, and the suffix component is at least m-bits long and is identical to the m first bits of the L-bit sequence. In other embodiments, the CFOF sequence includes a plurality of identical L-bit signature segments sandwiched between the prefix component and the suffix component. In other embodiments, the CFOF sequence includes a single L-bit signature segment and the prefix and suffix are each 1-bit values known to the second wireless device. After receiving the measurement packet, the second wireless device processes IQ or phase samples corresponding to the CFOF sequence to compute one or more carrier frequency offset estimates between the first and second wireless devices. In selected embodiments, the IQ sample processing includes processing IQ samples corresponding to the prefix component which serves as a first guard symbol for subsequent processing of IQ samples. In addition, the IQ sample processing includes processing IQ samples corresponding to each of the one or more signature segments by correlating the IQ samples against a reference vector to generate, for each of the one or more signature segments, a carrier frequency offset estimate between the first and second wireless devices. The IQ sample processing also include processing IQ samples corresponding to the suffix component which serves as a second guard symbol for previous processing of IQ samples. With the disclosed methodology and system, the second wireless radio device may compute the CFO estimate by receiving no more than three or four packets, including a start indication packet, a parameter configuration packet, and at least one measurement packet containing the CFOF sequence. In addition to other applications, the disclosed methodology and system may use the carrier frequency offset estimate as a metric for authenticating communication with a known peer device.

In another form, there has been provided a device and associated method for obtaining a carrier frequency offset estimate between first and second wireless devices in a wireless network. In the disclosed methodology, a first wireless device transmits a measurement packet to the second wireless device which includes a carrier frequency offset fingerprint (CFOF) sequence having a prefix component, one or more signature segments, and a suffix component. In selected embodiments where each signature segment includes an L-bit sequence with m first bits and m last bits, the prefix component is at least m-bits long and is identical to the m last bits of the L-bit sequence, and the suffix component is at least m-bits long and is identical to the m first bits of the L-bit sequence. In addition, the one or more signature segments may be a plurality of identical L-bit signature segments sandwiched between the prefix component and the suffix component. In other embodiments where the one or more signature segments is a single L-bit signature segment, the prefix component is 1-bit prefix known to the second wireless device, and the suffix component is a 1-bit long suffix known to the second wireless device. In addition, the disclosed methodology receives, at the first wireless device, one or more carrier frequency offset estimates computed at the second wireless device from samples received at the second wireless device corresponding to the CFOF sequence. In selected embodiments, the first wireless device also transmits a configuration to the second wireless device before transmitting the measurement packet, where configuration packet includes one or more configuration parameters specifying a bit pattern for each of the one or more signature segments. The configuration parameter(s) may also specify a location of the CFOF sequence in the measurement packet. In selected embodiments, the disclosed methodology includes transforming the CFOF sequence prior to insertion into the measurement packet by passing the CFOF sequence through a whitener linear feedback shift register (LFSR) which is set to an initial state corresponding to a starting point of the CFOF sequence within a PDU, thereby generating a whitened CFOF sequence for insertion into a PDU portion of the measurement packet.

In yet another form, there has been provided a device and associated method for estimating the carrier frequency offset between first and second wireless radio devices. As disclosed, the first wireless radio device includes a radio configured to receive, from a second wireless radio device, a BLE packet comprising an m-bit prefix component, one or more L-bit signature segments, and an m-bit suffix component, where the one or more L-bit signature segments are located entirely in an access address or data payload portion of the BLE packet. The first wireless radio device also includes a processor that is configured to compute a carrier frequency offset estimate between the first and second wireless radio devices by processing samples corresponding to the m-bit prefix component to serve as front end guard symbols to align signal phases at a front edge of the one or more signature segment. The processor is also configured to process samples corresponding to the one or more L-bit signature segments to compute one or more corresponding carrier frequency offset estimates between the device and the wireless radio device. In addition, the processor is configured to process samples corresponding to the m-bit suffix component to serve as back end guard symbols to align signal phases at a back edge of the one or more signature segment.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method of estimating a carrier frequency offset (CFO) between first and second wireless devices in a wireless network comprising:
   receiving, at the second wireless device, a CFO measurement packet transmitted by the first wireless device, where the CFO measurement packet includes at least one carrier frequency offset fingerprint (CFOF) sequence comprising a prefix component, one or more signature segments, and a suffix component;
   processing, at the second wireless device, samples corresponding to the CFOF sequence to compute one or more carrier frequency offset estimates between the first and second wireless devices; and
   configuring the second wireless device before receiving the CFO measurement packet based on one or more configuration parameters specifying a bit pattern for each of the one or more signature segments of the CFOF sequence in the CFO measurement packet, wherein the one or more configuration parameters further specify a number of signature elements in the one or more signature segments.

2. The method of claim 1, where the one or more one or more configuration parameters specify a location of the CFOF sequence in the CFO measurement packet.

3. The method of claim 1, where the one or more one or more configuration parameters specify how many CFOF sequences will be received by the second wireless device.

4. The method of claim 1, where each signature segment comprises an L-bit sequence with m first bits and m last bits; where the prefix component is at least m-bits long and is identical to the m last bits of the L-bit sequence; and where the suffix component is at least m-bits long and is identical to the m first bits of the L-bit sequence.

5. The method of claim 4, where the one or more signature segments comprise a plurality of identical L-bit signature segments sandwiched between the prefix component and the suffix component.

6. The method of claim 1, where the one or more signature segments is a single L-bit signature segment; where the prefix component is 1-bit prefix known to the second wireless device, and where the suffix component is a 1-bit long suffix known to the second wireless device.

7. The method of claim 1, where receiving the CFO measurement packet comprises receiving a Bluetooth Low Energy (BLE) packet comprising a preamble, an access address, and a data payload with the one or more signature segments located entirely in the access address or in the data payload.

8. The method of claim 1, where the second wireless radio device generates the carrier frequency offset estimate based on receiving no more than three or four packets, including a start indication packet, a parameter configuration packet, and at least one CFO measurement packet containing the CFOF sequence.

9. The method of claim 1, where processing, at the second wireless device, samples corresponding to the CFOF sequence comprises:
   processing Quadrature (IQ) samples corresponding to the prefix component which serves as a first guard symbol for subsequent processing of IQ samples;
   processing IQ samples corresponding to each of the one or more signature segments by correlating the IQ samples against a reference vector to generate, for each of the one or more signature segments, a carrier frequency offset estimate between the first and second wireless devices; and
   processing IQ samples corresponding to the suffix component which serves as a second guard symbol for previous processing of IQ samples.

10. The method of claim 1, further comprising using the carrier frequency offset estimate as a metric for authenticating communication with a known peer device.

11. The method of claim 1, where processing samples comprises processing phase samples corresponding to the CFOF sequence.

12. A method for obtaining a carrier frequency offset (CFO) estimate between first and second wireless devices in a wireless network comprising:
   transmitting, by the first wireless device to the second wireless device, a CFO measurement packet comprising a carrier frequency offset fingerprint (CFOF) sequence comprising a prefix component, one or more signature segments, and a suffix component;
   prior to the transmitting the CFO measurement packet, transmitting, by the first wireless device to the second wireless device, a configuration packet comprising one or more configuration parameters specifying a bit pattern for each of the one or more signature segments, wherein the one or more configuration parameters further specify a number of signature elements in the one or more signature segments; and
   receiving, at the first wireless device, one or more carrier frequency offset estimates computed at the second wireless device from samples received at the second wireless device corresponding to the CFOF sequence.

13. The method of claim 12, where the one or more configuration parameters further specify a location of the CFOF sequence in the CFO measurement packet.

14. The method of claim 12, where each signature segment comprises an L-bit sequence with m first bits and m last bits; where the prefix component is at least m-bits long and is identical to the m last bits of the L-bit sequence; and where the suffix component is at least m-bits long and is identical to the m first bits of the L-bit sequence.

15. The method of claim 14, where the one or more signature segments comprise a plurality of identical L-bit signature segments sandwiched between the prefix component and the suffix component.

16. The method of claim 12, where the one or more signature segments is a single L-bit signature segment; where the prefix component is 1-bit prefix known to the second wireless device, and where the suffix component is a 1-bit long suffix known to the second wireless device.

17. The method of claim 12, further comprising transforming the CFOF sequence prior to insertion into the CFO measurement packet by passing the CFOF sequence through a whitener linear feedback shift register (LFSR) which is set to an initial state corresponding to a starting point of the CFOF sequence within a PDU, thereby generating a whitened CFOF sequence for insertion into a PDU portion of the CFO measurement packet.

18. A first wireless radio device, comprising:
   a radio configured to receive, from a second wireless radio device, a Bluetooth Low Energy (BLE) carrier frequency offset (CFO) measurement packet comprising an m-bit prefix component, one or more L-bit signature segments, and an m-bit suffix component, where the one or more L-bit signature segments are located entirely in an access address or data payload portion of the BLE CFO measurement packet; and
   a processor configured to compute a carrier frequency offset estimate between the first and second wireless radio devices by:
   processing samples corresponding to the m-bit prefix component to serve as front end guard symbols to align signal phases at a front edge of the one or more signature segment;
   processing samples corresponding to the one or more L-bit signature segments to compute one or more corresponding carrier frequency offset estimates between the first and second wireless radio devices; and
   processing samples corresponding to the m-bit suffix component to serve as back end guard symbols to align signal phases at a back edge of the one or more signature segment, wherein the radio is configured to, prior to receiving the BLE carrier frequency offset (CFO) measurement packet, receive a configuration packet comprising one or more configuration parameters specifying a bit pattern for each of the one or more L-bit signature segments, wherein the one or more configuration parameters further specify a number of signature elements in the one or more L-bit signature segments.

* * * * *